US012080535B2

(12) United States Patent
Canterbury et al.

(10) Patent No.: US 12,080,535 B2
(45) Date of Patent: Sep. 3, 2024

(54) METHODS FOR TRANSFERRING IONS BETWEEN TRAPPING DEVICES OF VARIABLE INTERNAL PRESSURE

(71) Applicant: Thermo Finnigan LLC, San Jose, CA (US)

(72) Inventors: Jesse D. Canterbury, Shoreline, WA (US); Graeme C. McAlister, San Jose, CA (US)

(73) Assignee: Thermo Finnigan LLC, San Jose, CA (US)

( * ) Notice: Subject to any disclaimer, the term of this patent is extended or adjusted under 35 U.S.C. 154(b) by 0 days.

(21) Appl. No.: 16/886,288

(22) Filed: May 28, 2020

(65) Prior Publication Data

US 2021/0375606 A1 Dec. 2, 2021

(51) Int. Cl.

*H01J 49/42* (2006.01)
*H01J 49/00* (2006.01)
*H01J 49/02* (2006.01)
*H01J 49/06* (2006.01)
*H01J 49/10* (2006.01)

(52) U.S. Cl.

CPC .......... *H01J 49/022* (2013.01); *H01J 49/005* (2013.01); *H01J 49/065* (2013.01); *H01J 49/067* (2013.01); *H01J 49/10* (2013.01); *H01J 49/4225* (2013.01)

(58) Field of Classification Search

None
See application file for complete search history.

(56) References Cited

U.S. PATENT DOCUMENTS

| | | | | |
|---|---|---|---|---|
| 9,384,953 | B2 | 7/2016 | Fujita | |
| 10,665,441 | B2 | 5/2020 | McAlister et al. | |
| 2009/0090853 | A1 * | 4/2009 | Schoen | H01J 49/004 250/282 |
| 2011/0233396 | A1 * | 9/2011 | Hoyes | H01J 49/4235 250/282 |
| 2013/0214146 | A1 * | 8/2013 | Okumura | H01J 49/004 250/281 |

OTHER PUBLICATIONS

Thermo Scientific, "Orbitrap Eclipse Tribrid Mass Spectrometer—Go beyond todays discovery", Brochure, PS65451-EN 0519M, 2019, 8 pages.

* cited by examiner

*Primary Examiner* — James Choi
(74) *Attorney, Agent, or Firm* — Thomas F. Cooney

(57) ABSTRACT

A mass spectrometer system, comprises: an ion source; a first and a second multipole apparatus; one or more ion gates or ion lenses between the first and second multipole apparatuses; at least one power supply configured to provide voltages to electrodes of the ion source, the mass analyzer, the first and second multipole apparatuses and the one or more ion gates or ion lenses; and a computer or electronic controller electrically coupled to the at least one power supply, wherein the computer or electronic controller comprises computer-readable instructions that are operable to cause the at least one power supply to supply voltages to the electrodes that cause transfer of ions from the first multipole apparatus to the second multipole apparatus, wherein a duration of a time allotted for completion of the transfer of the ions is dependent upon one or more properties of the ions being transferred.

13 Claims, 12 Drawing Sheets

300

300

350

400

425

METHODS FOR TRANSFERRING IONS BETWEEN TRAPPING DEVICES OF VARIABLE INTERNAL PRESSURE

TECHNICAL FIELD

The present disclosure relates to mass spectrometers and mass spectrometry. More particularly, the present disclosure relates to trapping ions within and moving ions into and out of a trapping volume that includes some amount of an inert "bath" or "cooling" gas that serves to remove kinetic energy from the ions, via non-fragmenting collisions with the gas.

BACKGROUND

In a simple mass spectrometry (MS) system, ions of a sample are formed in an ion source, such as for instance an Electron Impact (EI) source, an Electrospray Ionization (ESI) source or an Atmospheric Pressure Ionization (API) source. The ions then pass through various intermediary apparatuses to a mass analyzer, such as for instance a quadrupole (Q) or a time of flight (TOF) device, for detection. The detected ions include at least one of molecular ions, fragments of the molecular ions, and fragments of other fragment ions, any of which may be multiply charged.

Tandem mass spectrometry (MS/MS) systems are well known. Such tandem systems are characterized by having two or more sequential stages of mass analysis and an intermediate ion fragmentation step, at which precursor ions from the first stage are fragmented into product ions for analysis within the second stage. So-called tandem-in-space mass spectrometers, such as for instance triple quadrupole (QqQ) and quadrupole-time of flight (Q-TOF) devices, have two distinct mass analyzers, one for precursor ion selection and one for product ion detection and/or measurement. An ion fragmentation device, such as for instance a gas-filled collision cell, is disposed between the two mass analyzers for receiving ions from the first mass analyzer and for fragmenting the ions to form product ions for introduction into the second mass analyzer.

FIG. 1A is a schematic illustration of an example of a conventional mass spectrometer system, shown generally at 1, capable of providing collisional ion dissociation. Referring to FIG. 1A, an ion source 3 housed in an ionization chamber 5 is configured to receive a liquid or gaseous sample from an associated apparatus such as for instance a liquid chromatograph or syringe pump through a capillary 2. As but one example, an atmospheric pressure electrospray source is illustrated. However, any ion source may be employed, such as a heated electrospray ionization (H-ESI) source, an atmospheric pressure chemical ionization (APCI) source, an atmospheric pressure matrix assisted laser desorption (MALDI) source, a photoionization source, or a source employing any other ionization technique or a combination of the above techniques. The ion source 3 generates charged particles 4 (either ions or charged droplets that may be desolvated so as to release ions) that are representative of the sample. The charged particles 4 are subsequently transported from the ion source 3 to the mass analyzer 39 in high-vacuum chamber 9 through one or more intermediate-vacuum chambers 7 and 8 of successively lower pressure in the direction of ion travel. In particular, the droplets or ions are entrained in a background gas and may be transported from the ion source 3 through an ion transfer tube 51 that passes through a first partition element or wall 10*a* into an intermediate-vacuum chamber 7 which is maintained at a pressure in the approximate range of 1-3 Torr. The ion transfer tube 51 may be physically coupled to a heating element or block 50 that provides heat to the gas and entrained particles in the ion transfer tube so as to aid in desolvation of charged droplets so as to thereby release free ions.

As a result of the differences in pressure between the ionization chamber 5 and the intermediate-vacuum chamber 7 (FIG. 1A), gases and entrained ions are caused to flow through ion transfer tube 51 into the intermediate-vacuum chamber 7. A second plate or partition element or wall 10*b* separates the intermediate-vacuum chamber 7 from a second intermediate-pressure chamber 8 that is maintained at a pressure in the approximate range of 100-200 milliTorr. Likewise, a third plate or partition element or wall 10*c* separates the second intermediate pressure region 8 from the high-vacuum chamber 9 within which the pressure is typically maintained at about $10^{-5}$ Torr. An additional vacuum chamber may be disposed between the illustrated chambers 8, 9. One or more first ion optical assemblies 27*a* provide an electric field(s) that guide(s) and focuses the ion stream leaving ion transfer tube 51 through an aperture 53 in the second partition element or wall 10*b* that may be an aperture of a skimmer 52. One or more second ion optical assemblies 27*b* may be provided so as to transfer or guide ions to an aperture 54 in the third plate or partition element or wall 10*c* and, similarly, another ion optical assembly 27*c* may be provided in the high vacuum chamber 9 containing a mass analyzer 39. The ion optical assemblies or lenses 27*a*-27*c* may comprise transfer elements, such as, for instance multipole ion guides, so as to direct the ions through apertures 53, 54 and into the mass analyzer 39. The mass analyzer 39 comprises one or more detectors 48 whose output can be displayed or stored as a mass spectrum. Vacuum ports 11, 12 and 13 may be used for evacuation of the various vacuum chambers.

The mass spectrometer system 1 (as well as other such systems illustrated herein) is in electronic communication with a controller 15 which includes hardware and/or software logic for performing data analysis and control functions. Such controller may be implemented in any suitable form, such as one or a combination of specialized or general-purpose processors, field-programmable gate arrays, and application-specific circuitry. In operation, the controller controls desired functions of the mass spectrometer system (e.g., analytical scans, isolation, and dissociation) by providing appropriate voltages (for instance, RF, DC and AC voltages) to the various electrodes of the ion source 3, the ion optical assemblies 27*a*-27*c* and the quadrupoles or mass analyzers 33, 36 and 39. The controller 15 may also receive and process signals from detectors 48. The controller 15 may be additionally configured to store and run data-dependent methods in which output actions are selected and executed in real time based on the application of certain criteria to previously acquired mass spectral data. The data-dependent methods, as well as the other control and data analysis functions, will typically be encoded in software or firmware instructions executed by controller 15. At least one power source 18 supplies an RF voltage to electrodes of the devices and at least one voltage source 21 is configured to supply DC voltages to certain of the devices.

As illustrated in FIG. 1A, an example of a conventional mass spectrometer system 1 is a triple-quadrupole system comprising a first quadrupole device 33, a second quadrupole device 36 and a third quadrupole device 39, the last of which is a mass analyzer comprising one or more ion detectors 48. The first, second and third quadrupole devices may be denoted as, using common terminology, as Q1, Q2 and Q3, respectively. A lens stack 34 disposed at the ion entrance to the second quadrupole device 36 may be used to provide a first voltage point along the ions' path. The lens stack 34 may be used in conjunction with ion optical elements along the path after stack 34 to impart additional kinetic energy to the ions. The additional kinetic energy is utilized in order to cause collisions between ions and neutral gas molecules within the second quadrupole device 36. If collisions are desired, the voltage of ion optical elements (not shown) after lens stack 34 are changed relative to lens stack 34 so as to provide a potential energy difference which imparts the necessary kinetic energy.

Various modes of operation of the triple quadrupole system 1 are known. In some modes of operation, the first quadrupole device is operated as an ion trap which is capable of retaining and isolating selected precursor ions (that is, ions of a certain mass-to-charge ratio, m/z) which are then transported to the second quadrupole device 36. More commonly, the first quadrupole device may be operated as a mass filter such that only ions having a certain restricted range of mass-to-charge ratios are transmitted therethrough while ions having other mass-to-charge ratios are ejected away from the ion path 6. In many modes of operation, the second quadrupole device is employed as a fragmentation device or collision cell which causes collision induced fragmentation of selected precursor ions through interaction with molecules of an inert collision gas introduced through tube 55 into a collision cell chamber 37. The second quadrupole 36 may be operated as an RF-only device which functions as an ion transmission device for a broad range of mass-to-charge ratios. The precursor and/or fragment ions are transmitted from the second quadrupole device 36 to the third quadrupole device (mass analyzer) 39 for mass analysis of the various ions, either ions generated by the ion source 3 or fragment ions generated by fragmentation in collision cell chamber 37.

The various ion optical assemblies 27*a*-27*c* and quadrupole devices 33, 36, 39, as known to those of ordinary skill in the art, can define an ion path 6 from the ionization chamber 5 to at least one detector 48. The electronic controller 15 is operably coupled to the various devices including pumps, sensors, ion source, ion guides, collision cells and detectors to control the devices and conditions at the various locations throughout the mass spectrometer system 1, as well as to receive data from the mass analyzer. If the second quadrupole device 36 is to be used only as a collision or fragmentation cell (or, in general, a reaction cell), then the second quadrupole device may be replaced by a hexapole or higher order multipole device or any other device that acts similarly, such as a stacked ring ion guide.

FIG. 1B is a schematic depiction of an exemplary mass spectrometer system 150 that may be employed for more complex mass spectrometry experiments and measurements, such as $MS^n$ experiments and measurements. The mass spectrometer illustrated in FIG. 1B is a hybrid mass spectrometer, comprising more than one type of mass analyzer, and is sold commercially by Thermo Fisher Scientific of Waltham, Massachusetts USA under the trade name ORBITRAP ECLIPSE™ TRIBRID™ mass spectrometer. Other mass spectrometer systems sold under the TRIBRID™ name are similar. Specifically, the mass spectrometer system 150 includes a quadrupole ion trap mass analyzer 116 as well as an ORBITRAP™ analyzer 112, which is a type of electrostatic trap mass analyzer. A hybrid mass spectrometer system such as depicted in FIG. 1B can be advantageously employed to improve duty cycles by using two or more analyzers simultaneously. The ORBITRAP™ mass analyzer 112 can provide mass accuracy better than one part-per-million and resolution up to 1000000 (FHWM) at m/z 200, depending on experimental conditions.

In operation of the mass spectrometer system 150, an electrospray ion source 101, such as a heated electrospray (HESI) ion source, provides ions of a sample to be analyzed to an aperture of a high-capacity heated ion transfer tube 102, at which point the ions enter into a first vacuum chamber. After entry, the ions are captured and focused into a tight beam by an ion funnel 104 or other ion optical assembly. A first ion optical transfer component 103*a* transfers the beam into downstream intermediate-vacuum regions of the mass spectrometer. Most remaining neutral molecules and undesirable ion clusters, such as solvated ions, are separated from the ion beam by a curved beam guide 106. Neutral molecules and ion clusters follow a straight-line path whereas the paths of ions of interest are bent around the ninety-degree turn of the curved beam guide, thereby producing the separation.

A quadrupole mass filter 108 of the mass spectrometer system 150 may be used in its conventional sense as a tunable mass filter so as to pass ions only within a certain mass-to-charge (m/z) range that is selectable. The apparatus 108 may also be operated in an "RF-only" mode which transmits ions without filtering. A subsequent ion optical transfer component 103*b* delivers the filtered ions to a curved ion trap (a so-called "C-trap") component 110. The C-trap 110 is able to transfer ions along a pathway between the quadrupole mass filter 108 and the ion trap mass analyzer 116. The C-trap 110 also has the capability to temporarily collect and store a population of ions and then deliver the ions, as a pulse or packet, into the ORBITRAP™ electrostatic trap mass analyzer 112. The transfer of packets of ions is controlled by the application of electrical potential differences between the C-trap 110 and a set of injection electrodes 111 disposed between the C-trap 110 and the mass analyzer 112. The curvature of the C-trap is designed such that the population of ions is spatially focused so as to match the angular acceptance of an entrance aperture of the mass analyzer 112.

Multipole ion guide 114 and optical transfer component 103*c* serve to guide ions between the C-trap 110 and the ion trap mass analyzer 116. The multipole ion guide 114 also may provide temporary ion storage capability such that ions produced in a first processing step of an analysis method can be later retrieved for processing in a subsequent step. The multipole ion guide 114 can also serve as a fragmentation cell that generates ion fragments (i.e., product ions) by collision-induced dissociation of precursor ions. Various ion optics, including the multipole ion guide 114 and optical transfer component 103*c*, that are disposed along the pathway between the C-trap 110 and the ion trap mass analyzer 116 are controllable such that ions may be transferred in either direction along the pathway, depending upon the sequence of ion processing steps required in a particular analysis method. Thus, the multipole ion guide 114 is also referred to as "ion routing multipole" 114.

The ion trap mass analyzer 116 is a dual-pressure linear ion trap (i.e., a two-dimensional trap) comprising a high-pressure linear trap portion 117*a* and a low-pressure linear trap portion 117*b*, the two cells being positioned adjacent to one another and separated by a plate lens having a small aperture that permits ion transfer between the two cells and that also acts as a pumping restriction that allows different pressures to be maintained in the two trap portions. The environment of the high-pressure portion 117*a* favors ion trapping, ion cooling, ion fragmentation by any of several methods, including either collision-induced dissociation or pulsed-q dissociation, ion/ion reactions by either electron transfer dissociation or proton-transfer reactions, and some types of photon activation, such as ultraviolet photo dissociation (UVPD). The environment of the low-pressure portion 117*b* favors analytical scanning and precursor-ion isolation with high resolving power and mass accuracy. The low-pressure cell includes a dual-dynode ion detector 115.

It has long been known that trapping of ions in ion traps is facilitated by filling the trapping volume with some amount of inert gas. The "bath" or "cooling" gas serves to take energy out of the ions, via non-fragmenting collisions, reducing ion energy and easing subsequent manipulations, especially for mass analysis. For example, the interior of the chamber 37 of the apparatus 1 may conventionally be provided with nitrogen at a typical pressure of approximately 2 mTorr. This pressure provides both good trapping efficiency and good fragmentation efficiency, the latter developing in cases where ions are accelerated into the gas as they enter the chamber, a process known as beam-type collision-induced dissociation.

As mass spectrometry applications have broadened, it has become appreciated that variation in the pressure of this cooling gas has certain benefits, for example increasing the gas pressure eases the trapping of larger molecules (e.g., proteins with m/z >6000). The versatility and high-transmission, high-accuracy and high-resolution capabilities of the apparatus 150 of FIG. 1B allow this apparatus to be employed for a broad range of applications. For example, the apparatus may be employed for quantitation and characterization of complex mixtures of proteins and deciphering higher-order protein structures as well as for quantitation and identification of small-molecule-based pharmaceuticals.

The present inventors have recognized that, although increasing internal gas pressures can facilitate the ion trapping process of high mass molecules such as proteins, it can nonetheless complicate the extraction process from a gas-containing chamber to a high-vacuum mass spectrometer. Such complications arise via a general decrease in the ions' mobility in the gas, presumably because the larger ions have larger collisional cross sections that increase the frequency of energy depleting collisions. If mass analysis of, for example, a protein commences before all protein ions have been transferred to a mass analyzer, then some ions will be lost and the instrument sensitivity for such ions will decrease. If, on the other hand, excessive transfer time is allotted for small m/z ions such as those from drug or drug metabolite compounds, then overall analytical efficiency will decrease. Accordingly, as mass spectrometer systems have become more complex, and the number of trapping devices within a single instrument has increased, there has developed a need to overcome the difficulties of efficiently cooling, transferring and detecting both high-mass and low-mass ions in a single mass spectrometer system. This work describes how to transfer ions efficiently between trapping devices by automatically increasing or decreasing the time allowed for such transfers to take place.

SUMMARY

The inventors have recognized that the time that is allotted for transferring ions from one apparatus to another within a mass spectrometer can be adjustable and, preferably, automatically adjustable based on the properties of the specific ions being transferred between the apparatuses, such as m/z values, molecular weights, charges, and mobility constant values. Additionally or alternatively, the electrical potential difference between different apparatuses and/or between gates or lens electrodes between the apparatuses can be adjustable based on the properties of the specific ions being transferred. Such adjustments may be made in order to efficiently transfer ions of all ion species without undue bias for particular ion species. Such operation can preserve the versatility of hybrid mass spectrometer systems to efficiently and accurately investigate ions of all sizes, masses and ion mobility cross sections.

In accordance with a first aspect of the present teachings, a mass spectrometer system is provided, the system comprising: an ion source; a first and a second multipole apparatus; one or more ion gates or ion lenses between the first and second multipole apparatuses; at least one power supply configured to provide voltages to electrodes of the ion source, the mass analyzer, the first and second multipole apparatuses and the one or more ion gates or ion lenses; and a computer or electronic controller electrically coupled to the at least one power supply, wherein the computer or electronic controller comprises computer-readable instructions that are operable to cause the at least one power supply to supply voltages to the electrodes that cause transfer of ions from the first multipole apparatus to the second multipole apparatus, wherein a duration of a time allotted for completion of the transfer of the ions is dependent upon one or more properties of the ions being transferred. According to some embodiments, the computer-readable instructions that are operable to cause the at least one power supply to supply voltages to the electrodes that cause the transfer of the ions are further operable such that the duration of the time allotted for completion of the transfer of the ions is also dependent on an internal gas pressure within either the first or the second multipole apparatus. According to some embodiments, the computer-readable instructions that are operable to cause the at least one power supply to supply voltages to the electrodes that cause the transfer of the ions are such that the duration of the time allotted for completion of the transfer of the ions is dependent upon one or more of the group of ion properties consisting of: ion mass-to-charge ratio (m/z), ion mass (m), and ion charge(z), and ion mobility constant.

According to some embodiments, the first multipole apparatus comprises internal electrodes that are electrically coupled to the at least one power supply and are configured to provide a voltage profile across a length of the first multipole apparatus. In such instances, the computer-readable instructions that are operable to cause the at least one power supply to provide voltages to the electrodes that cause the transfer of the ions from the first multipole apparatus may be further operable to cause the at least one power supply to supply voltages to the internal electrodes that cause the ions to accumulate in and be transferred from an end region of the first multipole apparatus. According to some embodiments, the second multipole apparatus comprises internal electrodes that are electrically coupled to the at least one power supply and are configured to provide a voltage profile across a length of the second multipole apparatus. In such instances, the computer-readable instructions that are operable to cause the at least one power supply to supply voltages to the electrodes that cause the transfer of the ions to the second multipole apparatus may be further operable to cause the at least one power supply to supply voltages to the internal electrodes that cause the ions to be transferred to accumulate in an end of the second multipole apparatus.

In some embodiments, the mass spectrometer system further comprises: a gas supply; a gas inlet valve that is electrically coupled to the computer or electronic controller and that is fluidically coupled to the gas supply; an enclosure that encloses either the first multipole apparatus or the second multipole apparatus; and a pressure sensor that is electrically coupled to the computer or electronic controller and that is fluidically coupled to an interior of the enclosure. In such instances, the computer or electronic controller may comprise computer-readable instructions that are operable to cause the gas inlet valve to variably open or close so as to maintain a constant gas pressure within the enclosure, wherein the gas pressure is dependent upon either mass-to-charge ratio (m/z), or mass (m) of the ions being transferred.

According to a second aspect of the present teachings, a method of mass spectrometry comprises: generating ions comprising a first mass-to-charge ratio (m/z) range and a second m/z range; transferring the ions comprising the first m/z range to a first multipole apparatus; determining a first time duration, $\Delta t_1$; commencing transfer of the ions comprising the first m/z range from the first multipole apparatus to a second multipole apparatus at a time $t_1'$; terminating the transfer of the ions comprising the first m/z range at a time, $t_1''$, where $t_1''=t_1''+\Delta t_1$; transferring the ions comprising the second m/z range to the first multipole apparatus; determining a second time duration, $\Delta t_2$; commencing transfer of the ions comprising the second m/z range from the first multipole apparatus to the second multipole apparatus at a time $t_2'$; and terminating the transfer of the ions comprising the second m/z range at a time, $t_2''$, where $t_2''=t_2'+\Delta t_2$, wherein $\Delta t_2 \neq \Delta t_1$. In some instances, the time durations $\Delta t_1$ and $\Delta t_2$ may be determined by consultation of a table of acceptable allotted ion transfer time ranges. In such instances, the table of acceptable allotted ion transfer time ranges may pertain to a specific internal gas pressure or range of pressures within one of the first and second multipole apparatuses. The table of acceptable allotted ion transfer time ranges may comprise a plurality of entries, wherein each entry in the table comprises a minimum time that must be allotted in order to complete the transfer of a certain pre-determined percentage of an ion species within an m/z range to which the entry pertains.

In some instances the table of allotted transfer times may be based upon the ions' initial location within the first multipole apparatus (as set by internal electrodes of the first multipole apparatus) or upon the ions' desired destination location within the second multipole apparatus (as set by internal electrodes of the second multipole apparatus). In some instances, the time durations $\Delta t_1$ and $\Delta t_2$ may be determined by consulting calibrated equations (in addition to or instead of a table) that allow for the interpolation of any m/z value along a continuous range. Either the first m/z range or the second m/z range may comprise a plurality of different ion species having different m/z values, all of which are within the respective range. In some instances, the first and second m/z ranges may be only a subset of a larger set of N different m/z ranges, where the ions of each mass range are transferred from the first multipole apparatus to the second multipole apparatus in accordance with a different respective time duration, $\Delta t_i$ ($1 \leq i \leq N$).

According to a third aspect of the present teachings, a method of mass spectrometry comprises: generating ions comprising a first range of ion masses (m) and a second range of ion masses; transferring the ions comprising the first ion mass range to a first multipole apparatus; determining a first time duration, $\Delta t_1$; commencing transfer of the ions comprising the first ion mass range from the first multipole apparatus to a second multipole apparatus at a time $t_1'$; terminating the transfer of the ions comprising the first ion mass range at a time, $t_1''$, where $t_1''=t_1'+\Delta t_1$; transferring the ions comprising the second ion mass range to the first multipole apparatus; determining a second time duration, $\Delta t_2$; commencing transfer of the ions comprising the second ion mass range from the first multipole apparatus to the second multipole apparatus at a time $t_2'$; and terminating the transfer of the ions comprising the second ion mass range at a time, $t_2''$, where $t_2''=t_2'+\Delta t_2$, wherein $\Delta t_2 \neq \Delta t_1$. In some instances, the time durations $\Delta t_1$ and $\Delta t_2$ may be determined by consultation of a table of acceptable allotted ion transfer time ranges. In such instances, the table of acceptable allotted ion transfer time ranges may pertain to a specific internal gas pressure or range of pressures within one of the first and second multipole apparatuses. The table of acceptable allotted ion transfer time ranges may comprise a plurality of entries, wherein each entry in the table comprises a minimum time that must be allotted in order to complete the transfer of a certain pre-determined percentage of an ion species within an m/z range to which the entry pertains.

In some instances the table of allotted transfer times may be based upon the ions' initial location within the first multipole apparatus (as set by internal electrodes of the first multipole apparatus) or upon the ions' desired destination location within the second multipole apparatus (as set by internal electrodes of the second multipole apparatus). In some instances, the time durations $\Delta t_1$ and $\Delta t_2$ may be determined by consulting calibrated equations (in addition to or instead of a table) that allow for the interpolation of any ion mass value, m, along a continuous range. Either the first ion mass range or the second ion mass range may comprise a plurality of different ion species having different ion mass values, all of which are within the respective range. In some instances, the first and second ion mass ranges may be only a subset of a larger set of M different mass ranges, where the ions of each mass range are transferred from the first multipole apparatus to the second multipole apparatus in accordance with a different respective time duration, $\Delta t_i$ ($1 \leq i \leq M$).

According to a fourth aspect of the present teachings, a method of mass spectrometry comprises: generating ions comprising a first mass-to-charge ratio (m/z) range and a second m/z range; transferring the ions comprising the first m/z range and the ions comprising the second m/z range to a first multipole apparatus such that the ions comprising both the first and second m/z ranges are trapped therein; determining a first time duration, $\Delta t_1$, wherein $\Delta t_1$ is a minimum time that must be allotted in order to complete the transfer of a certain pre-determined percentage of ion species having m/z values within the first m/z range from the first multipole apparatus to a second multipole apparatus; determining a second time duration, $\Delta t_2$, wherein $\Delta t_2$ is a minimum time that must be allotted in order to complete the transfer of the pre-determined percentage of ion species having m/z values within the second m/z range from the first multipole apparatus to the second multipole apparatus; commencing simultaneous transfer of the ions comprising the first m/z range and the second m/z range from the first multipole apparatus to the second multipole apparatus at a time $t_1'$; and terminating the transfer of ions at a time, $t_1''$, where $t_1''=t_1'+\Delta t_{max}$, where $\Delta t_{max}$ is the greater of $\Delta t_2$ and $\Delta t_2$. In some instances, the time durations $\Delta t_1$ and $\Delta t_2$ may be determined by consultation of a table of acceptable allotted ion transfer time ranges. In such instances, the table of acceptable allotted ion transfer time ranges may pertain to a specific internal gas pressure or range of pressures within one of the first and second multipole apparatuses. The table of acceptable allotted ion transfer time ranges may comprise a plurality of entries, wherein each entry in the table comprises a minimum time that must be allotted in order to complete the transfer of a certain pre-determined percentage of an ion species within an m/z range to which the entry pertains.

In some instances the table of allotted transfer times may be based upon the ions' initial location within the first multipole apparatus (as set by internal electrodes of the first multipole apparatus) or upon the ions' desired destination location within the second multipole apparatus (as set by internal electrodes of the second multipole apparatus). In some instances, the time durations $\Delta t_1$ and $\Delta t_2$ may be determined by consulting calibrated equations (in addition to or instead of a table) that allow for the interpolation of any m/z value along a continuous range. Either the first m/z range or the second m/z range may comprise a plurality of different ion species having different m/z values, all of which are within the respective range.

According to a fifth aspect of the present teachings, a method of mass spectrometry comprises: generating ions comprising a first range of ion masses (m) and a second range of ion masses; transferring the ions comprising the first ion mass range and the second ion mass range to a first multipole apparatus such that the ions comprising both the first and second ion mass ranges are trapped therein; determining a first time duration, $\Delta t_1$, wherein $\Delta t_1$ is a minimum time that must be allotted in order to complete the transfer of a certain pre-determined percentage of ion species having ion mass values within the first ion mass range from the first multipole apparatus to a second multipole apparatus; determining a second time duration, $\Delta t_2$, wherein $\Delta t_2$ is a minimum time that must be allotted in order to complete the transfer of the pre-determined percentage of ion species having ion mass values within the second ion mass range from the first multipole apparatus to the second multipole apparatus; commencing simultaneous transfer of the ions comprising the first ion mass range and the second ion mass range from the first multipole apparatus to the second multipole apparatus at a time $t_1'$; and terminating the transfer of ions at a time, $t_1''$, where $t_1''=t_1'+\Delta t_{max}$, where $\Delta t_{max}$ is the greater of $\Delta t_2$ and $\Delta t_2$. In some instances, the time durations $\Delta t_1$ and $\Delta t_2$ may be determined by consultation of a table of acceptable allotted ion transfer time ranges. In such instances, the table of acceptable allotted ion transfer time ranges may pertain to a specific internal gas pressure or range of pressures within one of the first and second multipole apparatuses. The table of acceptable allotted ion transfer time ranges may comprise a plurality of entries, wherein each entry in the table comprises a minimum time that must be allotted in order to complete the transfer of a certain pre-determined percentage of an ion species within an m/z range to which the entry pertains.

In some instances the table of allotted transfer times may be based upon the ions' initial location within the first multipole apparatus (as set by internal electrodes of the first multipole apparatus) or upon the ions' desired destination location within the second multipole apparatus (as set by internal electrodes of the second multipole apparatus). In some instances, the time durations $\Delta t_1$ and $\Delta t_2$ may be determined by consulting calibrated equations (in addition to or instead of a table) that allow for the interpolation of any ion mass value, m, along a continuous range. Either the first ion mass range or the second ion mass range may comprise a plurality of different ion species having different ion mass values, all of which are within the respective range.

BRIEF DESCRIPTION OF THE DRAWINGS

The above noted and various other aspects of the present invention will become apparent from the following description which is given by way of example only and with reference to the accompanying drawings, not necessarily drawn to scale, in which.

DETAILED DESCRIPTION

Figure 1A:
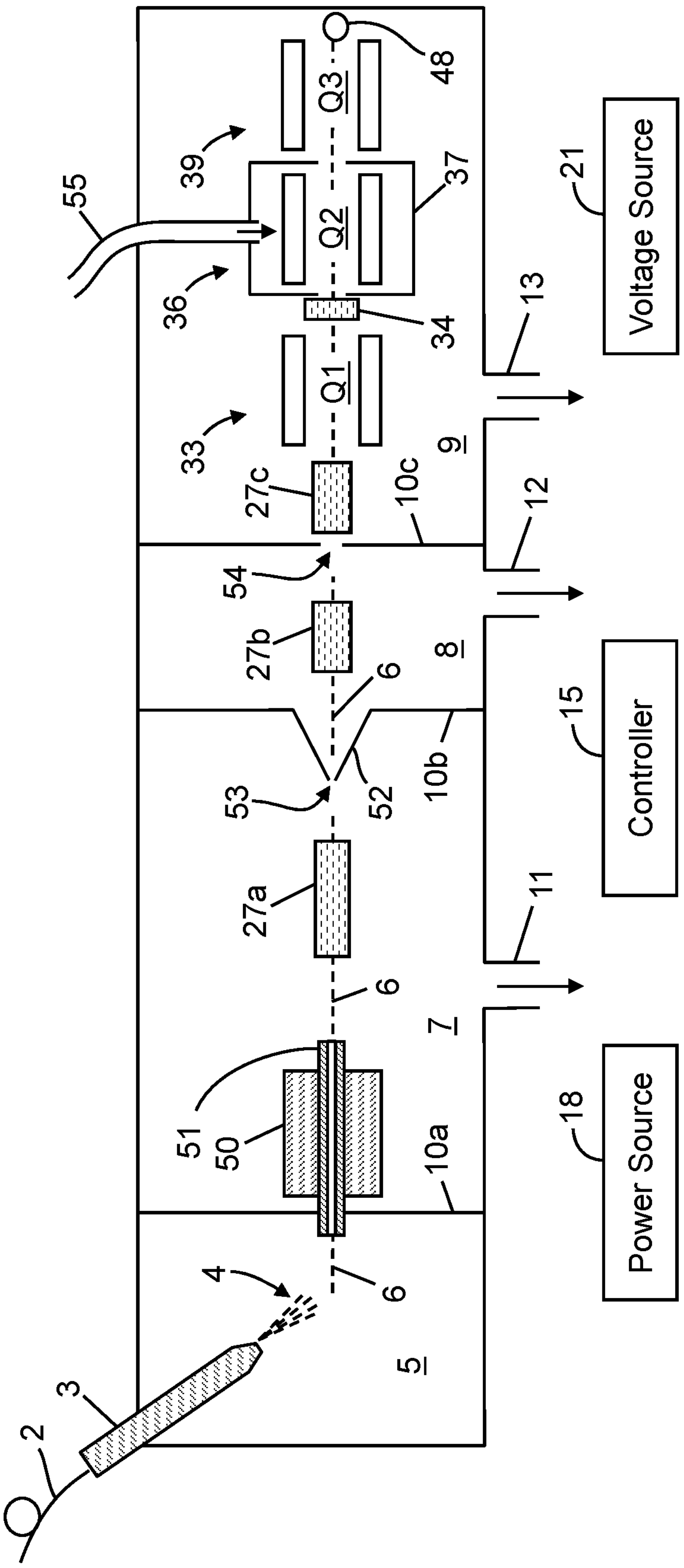
FIG. 1A is a schematic illustration of an example of a conventional mass spectrometer system that is capable of providing collisional ion dissociation.

The following description is presented to enable any person skilled in the art to make and use the invention, and is provided in the context of a particular application and its requirements. Various modifications to the described embodiments will be readily apparent to those skilled in the art and the generic principles herein may be applied to other embodiments. Thus, the present invention is not intended to be limited to the embodiments and examples shown but is to be accorded the widest possible scope in accordance with the features and principles shown and described. To fully appreciate the features of the present invention in greater detail, please refer to FIGS. 1A-1B, 2A-2B, 3A-3B, 4A-4D, 5A-5B, 6A-6B and 7 in conjunction with the following description.

In the description of the invention herein, it is understood that a word appearing in the singular encompasses its plural counterpart, and a word appearing in the plural encompasses its singular counterpart, unless implicitly or explicitly understood or stated otherwise. Furthermore, it is understood that, for any given component or embodiment described herein, any of the possible candidates or alternatives listed for that component may generally be used individually or in combination with one another, unless implicitly or explicitly understood or stated otherwise. Additionally, it will be understood that any list of such candidates or alternatives is merely illustrative, not limiting, unless implicitly or explicitly understood or stated otherwise. Moreover, it is to be appreciated that the figures, as shown herein, are not necessarily drawn to scale, wherein some of the elements may be drawn merely for clarity of the invention. Also, reference numerals may be repeated among the various figures to show corresponding or analogous elements.

Unless otherwise defined, all other technical and scientific terms used herein have the meaning commonly understood by one of ordinary skill in the art to which this invention belongs. In case of conflict, the present specification, including definitions, will control. It will be appreciated that there is an implied "about" prior to the quantitative terms mentioned in the present description, such that slight and insubstantial deviations are within the scope of the present teachings. Also, the use of "comprise", "comprises", "comprising", "contain", "contains", "containing", "include", "includes", and "including" are not intended to be limiting. As used herein, "a" or "an" also may refer to "at least one" or "one or more." Also, the use of "or" is inclusive, such that the phrase "A or B" is true when "A" is true, "B" is true, or both "A" and "B" are true. As used herein, the term "DC", when referring to a voltage applied to one or more electrodes of a mass spectrometer component, does not necessarily imply the imposition of or the existence of an electrical current through those electrodes but is used only to indicate that the referred-to applied voltage either is static or, if non-static, is non-oscillatory and non-periodic. The term "DC" is thus used herein to distinguish the referred-to voltage(s) from applied periodic oscillatory voltages, which themselves may be referred to as either "RF" (Radio Frequency) or "AC" (Alternating Current) voltages.

Generally considered, the portion of the mass spectrometer system 150, as well as of similar systems, that is upstream from the ion trap 116 comprises a sequence of RF ion guides 104, 103*a*, 106, 108, 103*b*, 110, 114, 103*c* that are separated by static-field lenses (mostly not shown). In combination, the lenses enable ion trapping in several of the RF ion guide devices, such as the C-trap 110 and the ion-routing multipole (IRM) 114. After passing through the ion source region, the 90-degree-bent ion guide 106, the quadrupole mass filter 108, and other devices, ions eventually may pass through the C-trap 110 and enter the ion-routing multipole (IRM) 114, which is enclosed within a separate chamber that contains a typical gas pressure (e.g., of nitrogen) of 8 mTorr. Gas may be introduced into either (or both) the ion routing multipole 114 or the high-pressure ion trap portion for the purpose of fragmenting ions by collision-induced dissociation.

Figure 2A:
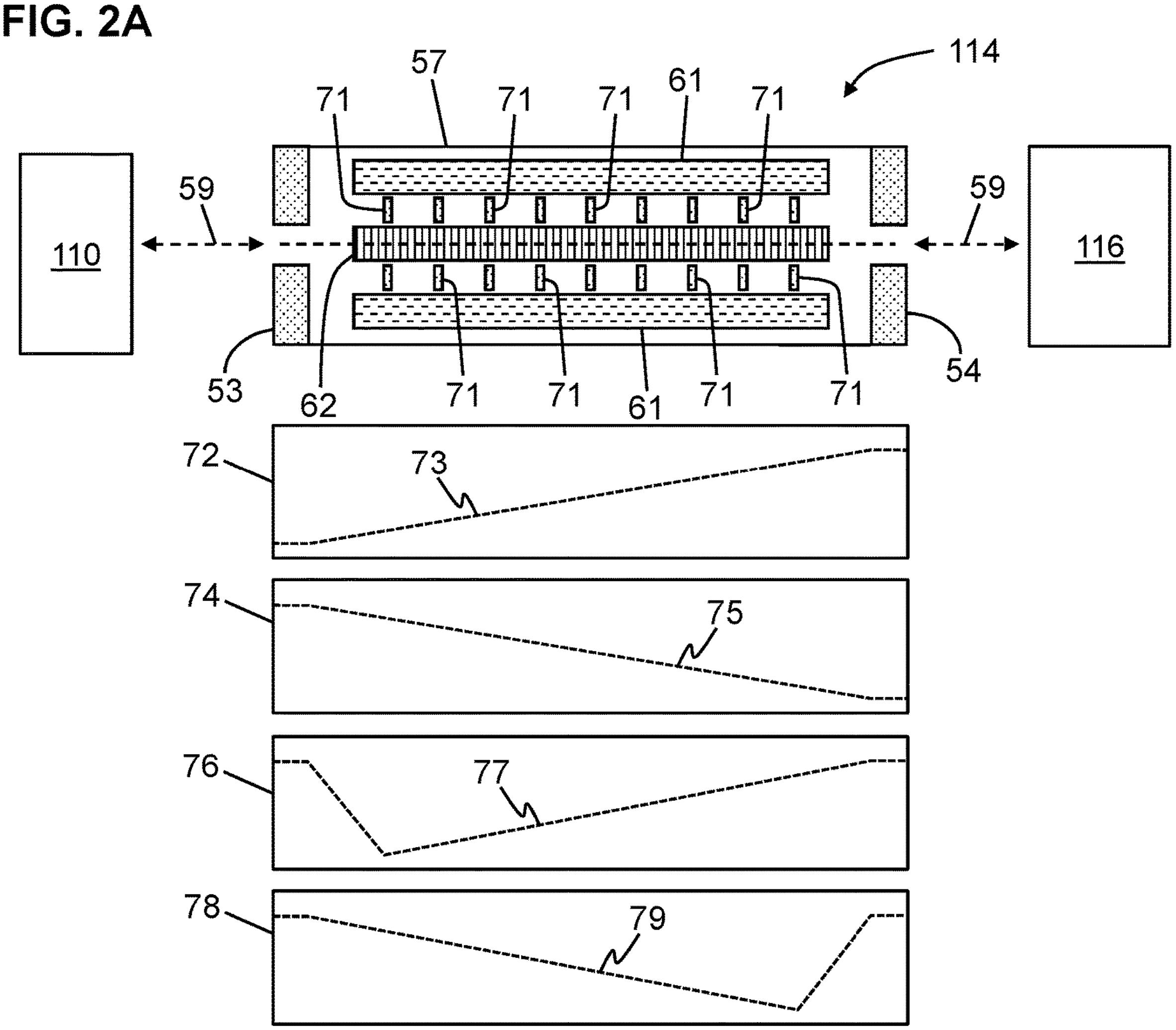
FIG. 2A is a schematic longitudinal depiction of a version of the ion routing multipole of FIG. 1B that is configured with auxiliary electrodes for applying axial field profiles.

The dual mass analyzer configuration of the system 150 creates multiple situations in which ions may be routed to or through the ion routing multipole 114 as is indicated by the double-headed arrows of the dashed line indicating the general ion pathway 59 in FIG. 2A. Ions may be sent to the IRM 114 for temporary storage or fragmentation from either the C-Trap 110 or the high-pressure ion trap 116. The IRM may then transfer the stored ions or generated product ions in either direction to one of the two mass analyzers.

Figure 2B:
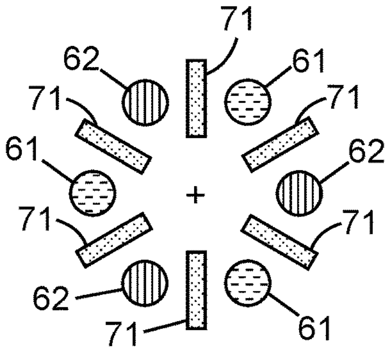
FIG. 2B is a schematic cross-sectional depiction of one example of an ion routing multipole as may be employed in the apparatus of FIG. 2A.

The version of the IRM 114 depicted in FIGS. 2A-2B provides for the application of internal axial fields for urging ions through the apparatus. FIG. 2A and FIG. 2B are schematic longitudinal and transverse cross-section depictions of an exemplary ion routing multipole comprising six rod electrodes. In alternative versions, an ion routing multipole apparatus may comprise some other suitable number of rod electrodes such as, for example, four rod electrodes. The axial fields may be supplied by controlling DC voltages on lenses 53, 54 and auxiliary electrodes 71. Such axial fields, also known as drag fields, may be generated by a variety of electrode configurations, such as are taught in U.S. Pat. No. 7,675,031, for example. In the example illustrated herewith, the auxiliary electrodes may be provided as arrays of finger electrodes that are inserted between main RF electrodes (e.g., the rod electrodes 62, 61 shown in FIGS. 2A-2B) of a multipole device (illustrated in FIGS. 2A-2B as a hexapole device). The electrodes 71 may be provided on thin substrate material such as printed circuit board material.

A voltage profile can be applied along the set of auxiliary electrodes 71; four such voltage profiles 73, 75, 77 and 79 are depicted in boxes 72, 74, 76 and 78, respectively, of FIG. 2A. Profiles 73 and 75 are suitable, under normal operation, for transferring ions from the linear ion trap 116 to the C-Trap 110 (i.e., "upstream") and from the C-Trap to the linear ion trap (i.e., "downstream"), respectively, through the IRM 114. Profiles 77 and 79 are suitable for trapping ions in an upstream end and a downstream end, respectively, of the IRM. According to some embodiments, the voltages applied to auxiliary electrodes 71 either monotonically increase or decrease, whereas voltage step discontinuities, such as are depicted in profiles 73 and 75, are only generated only between one of the lenses 53, 54 and an adjacent one of the auxiliary electrodes 71. According to some other embodiments, the voltages applied to one or more of the individual electrodes 71 are independently programmable, relative to their neighboring electrodes, thus providing means to generate complex potential profiles. The auxiliary electrodes 71 can occupy positions that generally define planes that, if extended, intersect on the central longitudinal axis of the IRM, which coincides with the general pathway 59. These planes can be positioned between adjacent RF rod electrodes at about equal distances from the main RF electrodes of the multipole ion guide device so as to minimize interference with the quadrupolar fields.

The one-dimensional drift velocity of ions moving in a uniform gas in a uniform electric field is given by:

$$v = KE \quad \text{Eq. 1}$$

where E is the electric field and K is the mobility. Thus, the greater the mobility, the faster ions can move through the gas, at a constant applied field. The mobility is a property of the ion motion that describes interacting aspects of the physical situation, most notably the gas density and the scattering cross-section of the ions. The mobility K is often referenced to a standard mobility, $K_0$, which is the mobility at standard temperature and pressure. In terms of $K_0$, the mobility is:

$$K \sim CK_0/p \quad \text{Eq. (2)}$$

where C is a constant at constant temperature. Therefore, the drift velocity, v, is inversely proportional to the pressure, p, of the gas in which the ions move, as given by $$v \sim CE/p \quad \text{Eq. (3)}$$

(Mason and McDaniel, *Transport Properties of Ions in Gases*, John Wiley & Sons, 1988).

For a cloud of trapped ions, in order to move the cloud some distance, an electric field must be applied for a certain amount of time. If the pressure of the surrounding gas is then increased and the ions still need to be moved through that same distance, either the applied field must be increased or the time over which the field is applied must be increased, to account for the decrease in ion mobility brought about by the increase in gas pressure.

In general, the transfer efficiency between the IRM 114 and other devices in the system 150 (FIG. 1B) is known to be quite good when the IRM internal pressure is 8 mTorr. For example, gas leaking from the IRM 114 into the adjacent C-trap 110 provides for good trapping efficiency in the C-trap. Further, axial fields within the IRM can provide the necessary force to move ions from the IRM into the C-trap 110 quickly, well within the typical allowed transfer time of 3 ms. This scheme works quite well for a wide m/z range of analyte molecules, from m/z=50 up to at least m/z=4000. Unfortunately, the transfer efficiency degrades for very large molecules of m/z>4000, or molecular weight above about 40-50 kDa. Such ions require greater gas pressures (e.g., 10-20 mTorr) in order to facilitate their trapping and cooling in a receiving apparatus. The present inventors have recognized that one cause for the apparent poor trapping efficiency of such high-mass ions is that, because of the reduced transfer speed of these ions at the higher pressures, the typical time allotted for ion capture is insufficient for capturing all available ions. The transfer speed of such ions is reduced in both an absolute sense as well as relative to the transfer speeds of ions having lower m/z or mass values.

FIGS. 3A-3B, 4A-4D, 5A-5B and 6A-6B show the results of the inventors' investigations relating to the effect of gas pressure on the efficiency of ion transfer and ion capture of eleven different standard calibrant ions. All data in these graphical plots were obtained by measuring mass spectral intensities of ions generated from a set of standard calibrant materials, where the mass-to-charge range of the ions ranged from m/z=69 to m/z=1822. The inventors have recognized that, with regard to complex hybrid mass spectrometer systems, such as the system 150, that comprise multiple devices that may be potentially used for ion storage, ion fragmentation and/or ion transfer, different calibrations need to be developed depending on the origination location and the destination location of the transfer in question.

Figure 1B:
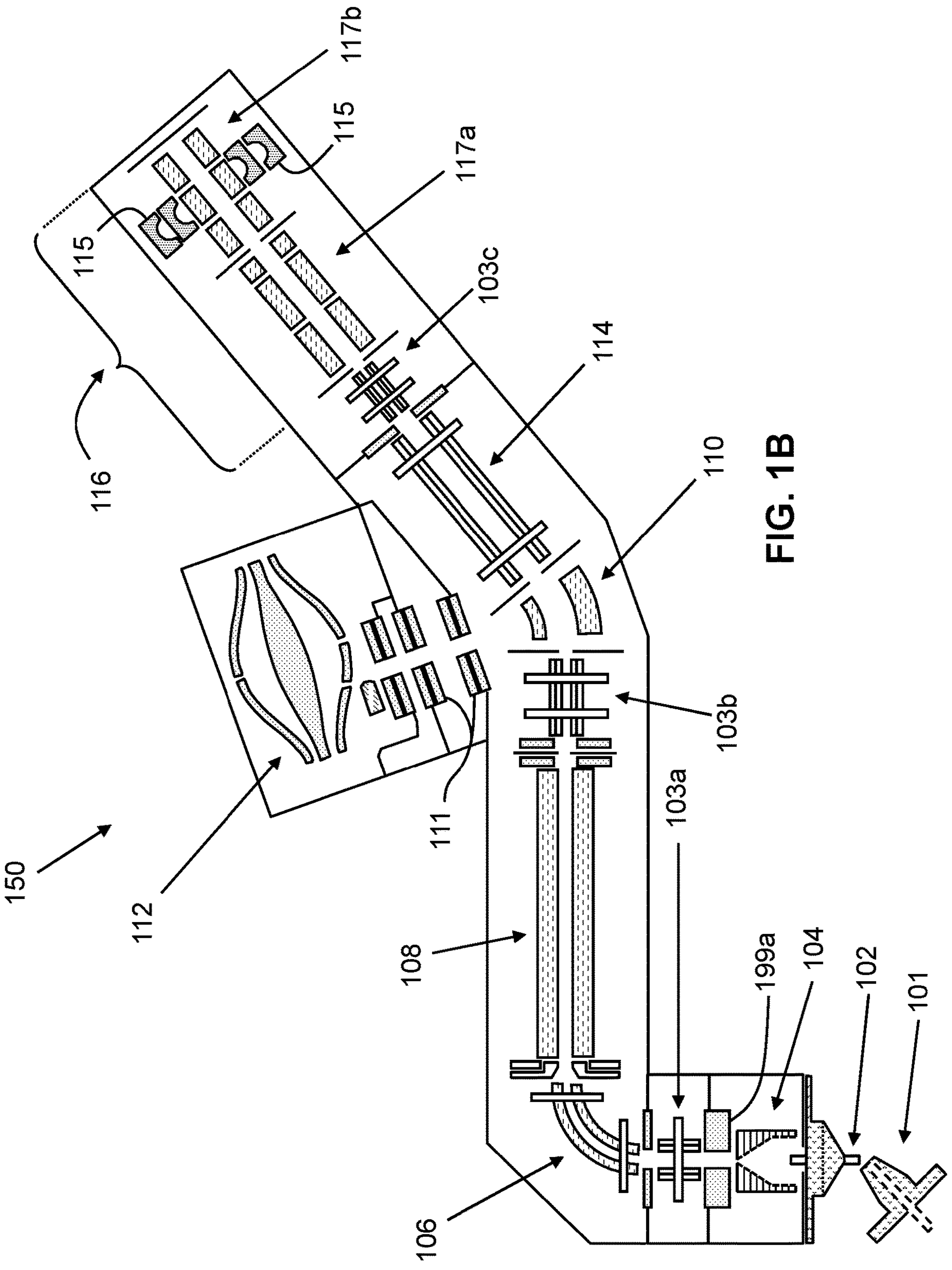
FIG. 1B is a schematic depiction of a known hybrid mass spectrometer system comprising two different types of mass analyzers.
Figure 3A:
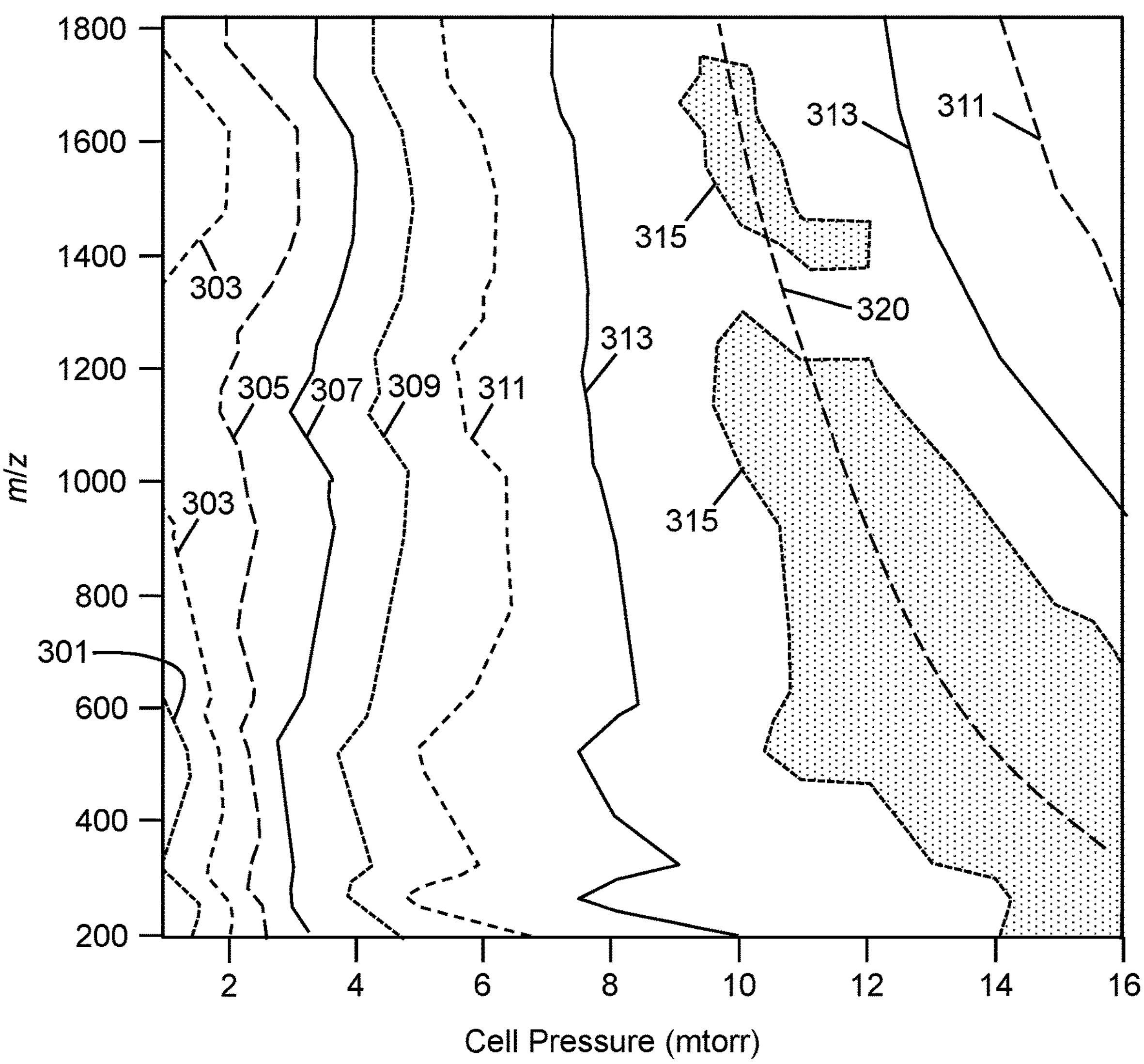
FIG. 3A is a contour plot of the efficiency of ion transfer, in percent, from the ion routing multipole apparatus of FIG. 1B to the C-Trap of the same mass spectrometer system versus the two independent variables of mass-to-charge (m/z) and gas pressure within the ion routing multipole during a fixed transfer time of 3 ms.

FIG. 3A, which pertains to a fixed transfer time of 3 ms, is a contour plot 300 of the efficiency of ion transfer, in percent, from the ion routing multipole apparatus of FIG. 1B to the C-Trap of the same mass spectrometer versus the two independent variables of mass-to-charge (m/z) and IRM pressure. Isopleth lines 301, 303, 305, 307, 309, 311, 313, and 315 pertain to measured normalized transfer efficiencies of approximately 55, 65, 70, 77, 83, 88, 95 and 99 percent, respectively. This plot shows that, at a fixed transfer time of 3 ms, there is an optimum IRM pressure for each respective m/z value (i.e., along line 320) at which transmission efficiency of ions having the m/z value are maximized. For most ions of general interest, in the range 200<m/z<2000, the optimum pressure is in the approximate range of 10-11 mTorr which is close to the typically utilized gas pressure of 8 mTorr. The optimum gas pressure represents a balance between low gas pressures at which energetic ions may escape from the system as a result of insufficient collisions with neutral gas molecules and high gas pressures at which ion transport at the fixed transfer time is hindered by a reduced ion mobility. The plot 300 also indicates that, for m/z values that are greater than 1000 Th, the width of the optimal pressure region narrows and suggests that, at still greater m/z values, the isopleths may cross the line 320.

Figure 3B:
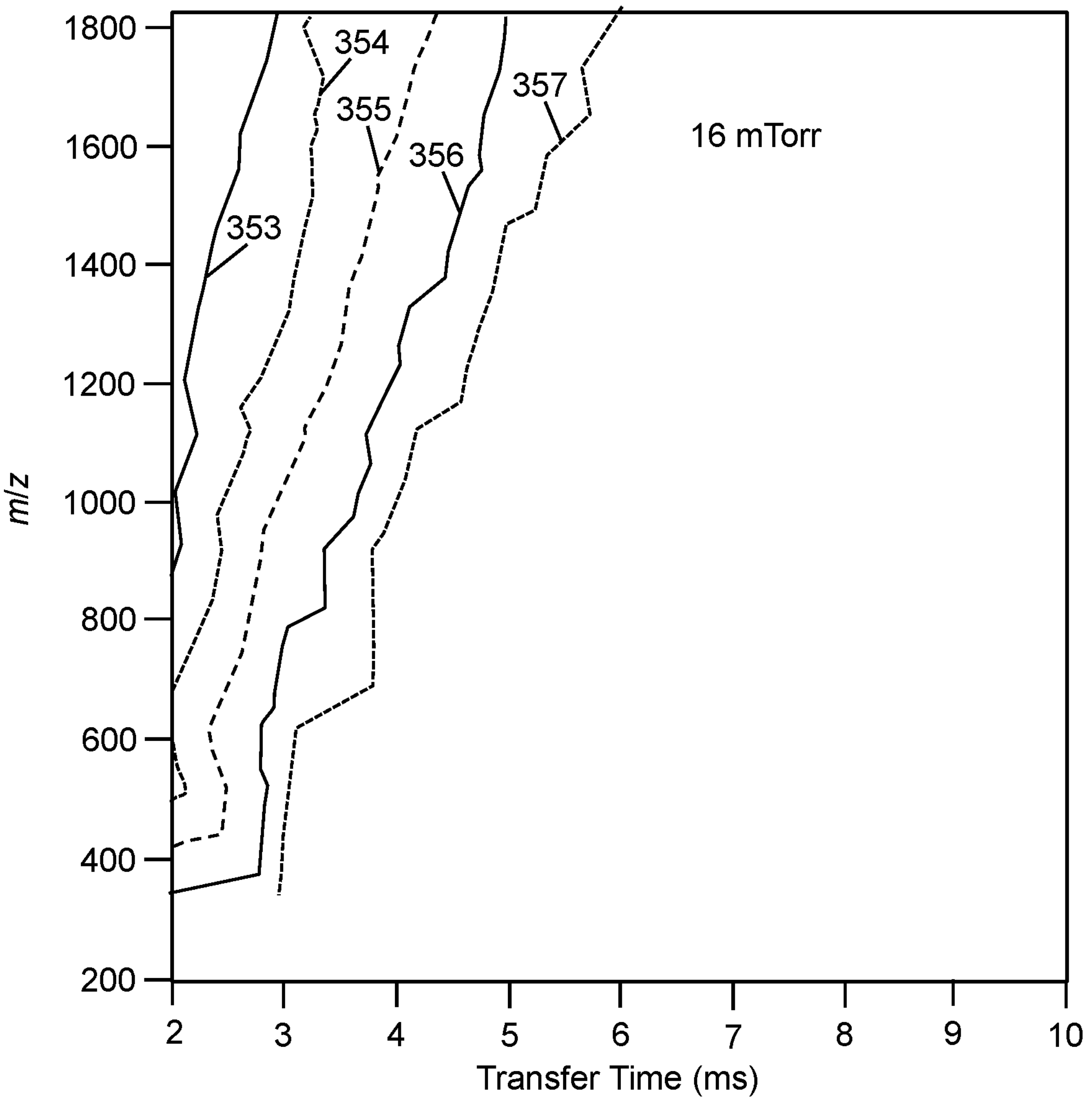
FIG. 3B is a contour plot of the efficiency of ion transfer from the ion routing multipole apparatus of FIG. 1B to the C-Trap of the same mass spectrometer system versus the two independent variables of transfer time and mass-to-charge (m/z) as determined at a fixed gas pressure within the ion routing multipole of 16 mTorr.

FIG. 3B, which pertains to a fixed, elevated IRM pressure of 16 mTorr, is a contour plot of the efficiency of ion transfer from the ion routing multipole apparatus of FIG. 1B to the C-Trap of the same mass spectrometer versus the two independent variables of mass-to-charge (m/z) and transfer time. Isopleth lines 353, 354, 355, 356 and 357 pertain to normalized transfer efficiencies of approximately 85, 89, 92, 95 and 99 percent, respectively. In the experiments for which the data is plotted in FIG. 3B, the pressure is held constant at 16 mTorr, and the time allowed to transfer ions between the IRM and the C-trap is varied. This graph shows that, for all ion species, transfer efficiency may be recovered, up to 100 percent, by increasing the time allotted for transfer.

Figure 4A:
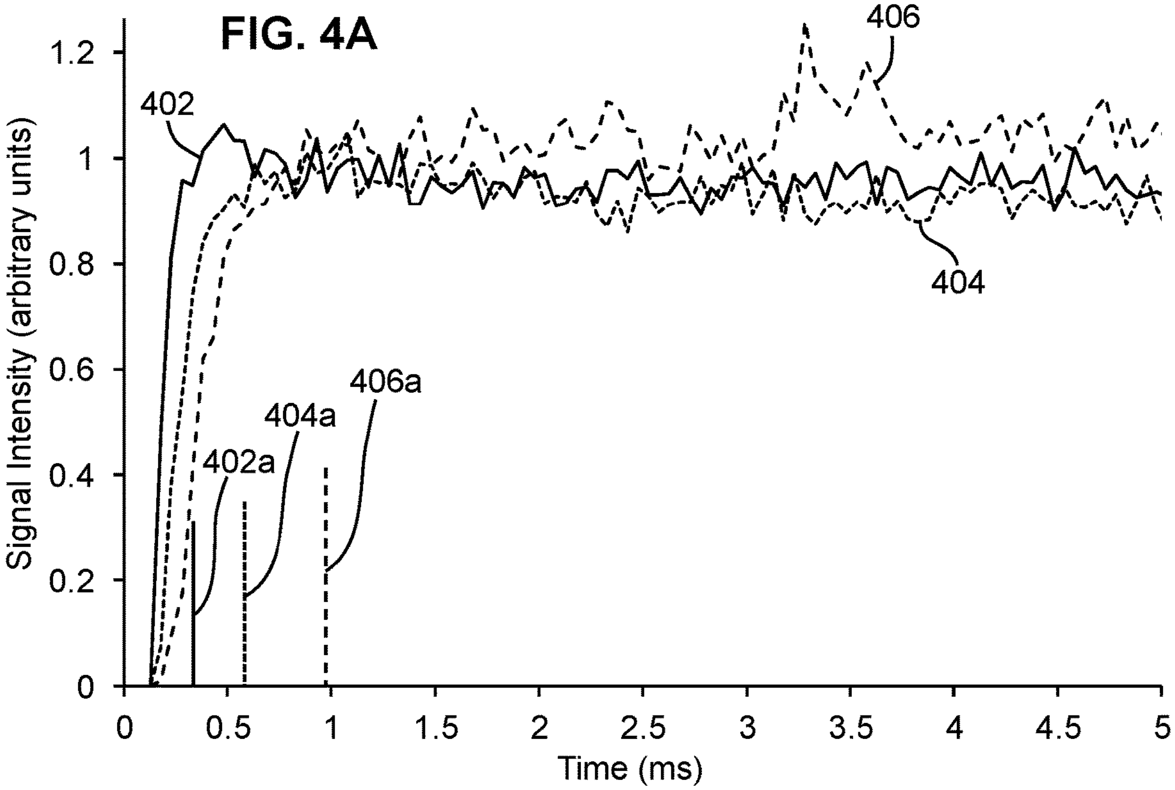
FIG. 4A is a plot of normalized observed signal intensities of ions of selected ion species within the ion trap of FIG. 1B versus flight times from the downstream end of the ion routing multipole apparatus to the high-pressure ion trap, where gas pressure in the ion routing multipole is 3 mTorr.
Figure 4B:
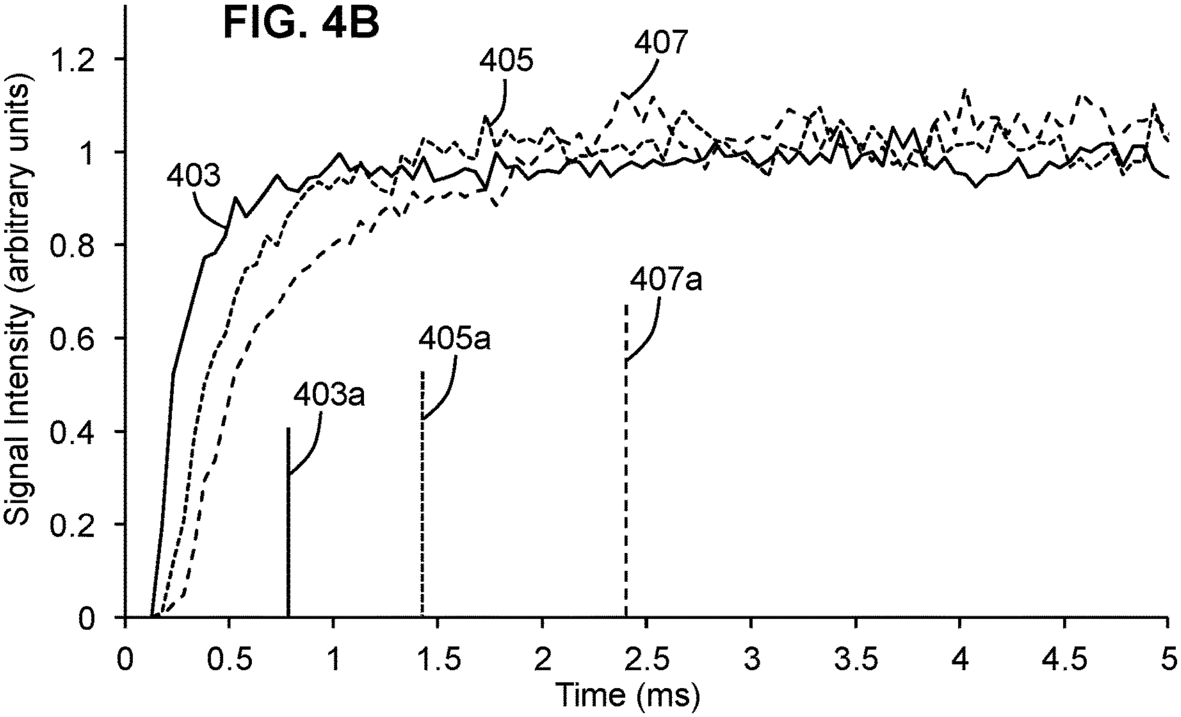
FIG. 4B is a plot of normalized observed signal intensities of ions of selected ion species within the ion trap of FIG. 1B versus flight times from the downstream end of the ion routing multipole apparatus to the high-pressure ion trap, where gas pressure in the ion routing multipole is 20 mTorr.
Figure 4C:
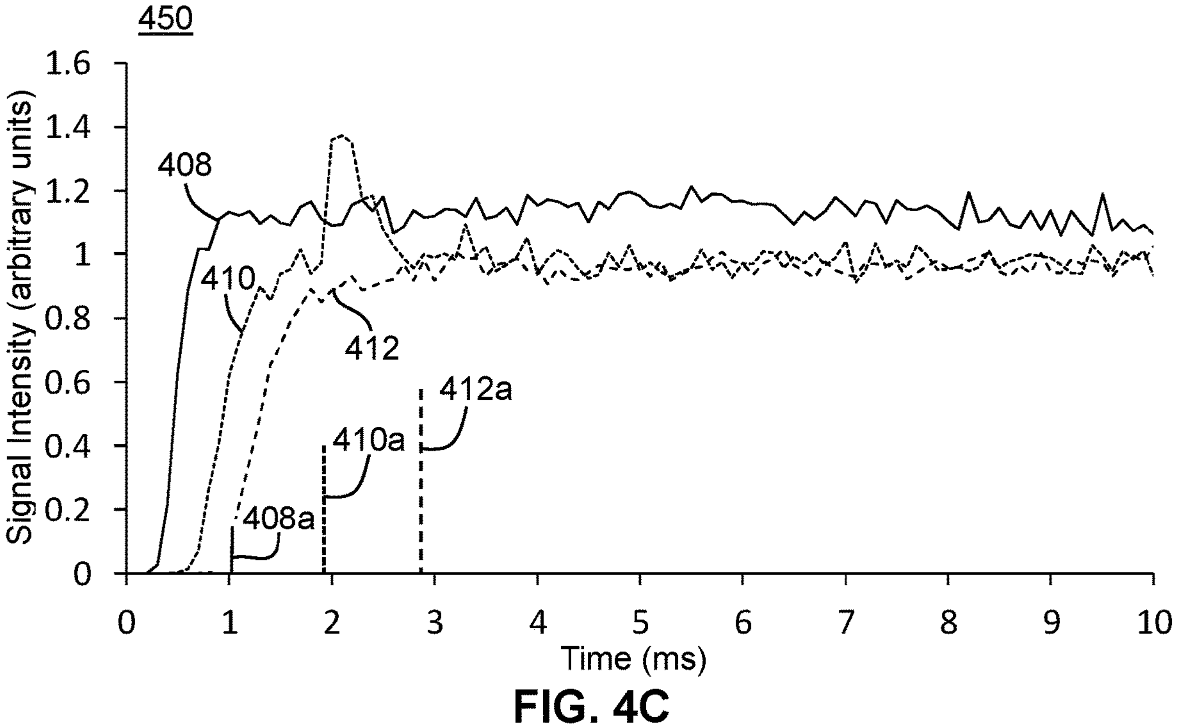
FIG. 4C is a plot of normalized observed signal intensities of ions of selected ion species within the ion trap of FIG. 1B versus flight times from the upstream end of the ion routing multipole apparatus to the high-pressure ion trap, where gas pressure in the ion routing multipole is 3 mTorr.
Figure 4D:
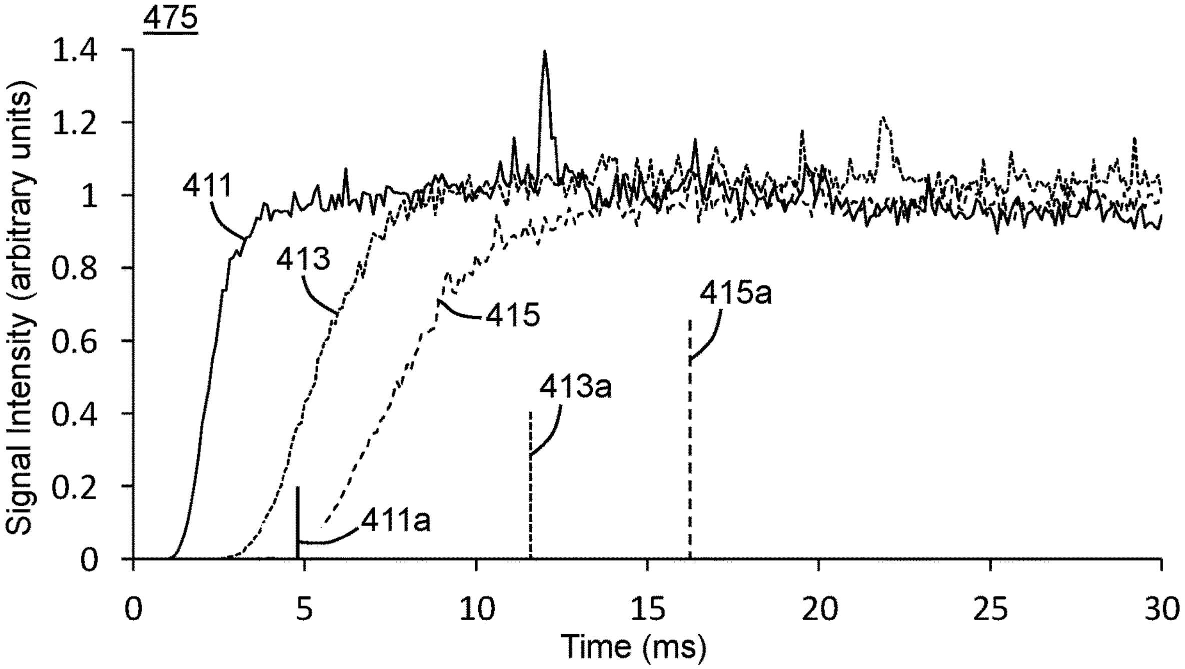
FIG. 4D is a plot of normalized observed signal intensities of ions of selected ion species within the ion trap of FIG. 1B versus flight times from the upstream end of the ion routing multipole apparatus to the high-pressure ion trap, where gas pressure in the ion routing multipole is 20 mTorr.

Each of FIGS. 4A-4D, containing plots 400, 425, 450 and 475, respectively, represents transfer of standard calibrant ions out of the ion routing multipole 114 in the downstream direction to the high-pressure ion trap 110. FIGS. 4A-4B (plots 400 and 425) represent transfer from the downstream end of the IRM 114, adjacent to the lens 54, from a potential well that is either the same as or similar to the potential profile 79 illustrated in FIG. 2A. FIGS. 4C-4D (plots 450 and 475) represent transfer from the upstream end of the IRM, adjacent to the lens 53, from a potential well that is either the same as or similar to the potential profile 77. The internal pressure of the IRM was maintained at 3 mTorr during collection of the data plotted in FIGS. 4A and 4C (plots 400 and 450). The internal pressure of the IRM was maintained at 20 mTorr during collection of the data plotted in FIGS. 4B and 4D (plots 425 and 475).

For clarity of presentation only data for three of the eleven calibrant ion species are depicted in FIGS. 4A-4D. Plots 402, 403, 408 and 411 pertain to a calibrant ion having m/z=69.04. Plots 404, 405, 410 and 413 pertain to a calibrant ion having m/z=524.6. Plots 406, 407, 412 and 415 pertain to a calibrant ion having m/z=1421.98. Noise in the plots generally pertains to electrospray variability. To account for the noise, each curve was fit to a smooth function that approached an asymptote, and the data of the curve was then normalized to the signal intensity value at which the curve passed through the value that was ninety percent of the respective asymptote value. The time value at which the curve crossed the ninety percent value was taken as the time required to essentially transfer all of the ions. These determined transfer times are noted by the time values of vertical lines extending upward from the horizontal axis. Specifically, the locations of vertical lines 402*a*, 403*a*, 408*a* and 411*a* denote the determined transfer times of the calibrant ion having m/z=69.04. Likewise, the locations of vertical lines 404*a*, 405*a*, 410*a* and 413*a* denote the determined transfer times of the calibrant ion having m/z=524.6. Likewise, the locations of the vertical lines 406*a*, 407*a*, 412*a* and 415*a* denote the determined transfer times of the calibrant ion having m/z=1421.98.

Comparison of FIGS. 4C-4D with FIGS. 4A-4B show that there is a significant time advantage to transferring ions to the ion trap 116 out of the end of the IRM 114 that is closest to the ion trap, with the time advantage becoming more significant with higher pressure. The extra time required to transfer the ions from the opposite end of the IRM represents the time required to pull the ions through the bath gas along essentially the full length of the IRM. If ions are to be transferred through the IRM from the C-Trap 110 to the linear ion trap 116 or from the linear ion trap 116 to the C-Trap, then time savings may be achieved, in some instances, by first transferring the ions to the end of the IRM that is nearest to the apparatus from which the ions are being transferred. The ions may then be redistributed to the opposite end of the IRM while the intended destination apparatus is performing some other function. The redistribution can be achieved by gradually transitioning the profile 79 into the profile 77 or vice versa (see FIG. 2A). The ions can then be transferred out of the IRM to the destination apparatus once both devices are ready.

FIGS. 4A and 4C both relate to flight times out of an ion routing multipole when gas pressure in the ion routing multipole is 3 mTorr. These may be compared to FIGS. 4B and 4D, respectively, which both relate to flight times out of the ion routing multipole when gas pressure in the ion routing multipole is 20 mTorr. Such comparisons highlight the pressure dependence of the transfer time. Additional time is needed to transfer the ions from the IRM to the high-pressure ion trap when the pressure is increased.

Figure 5A:
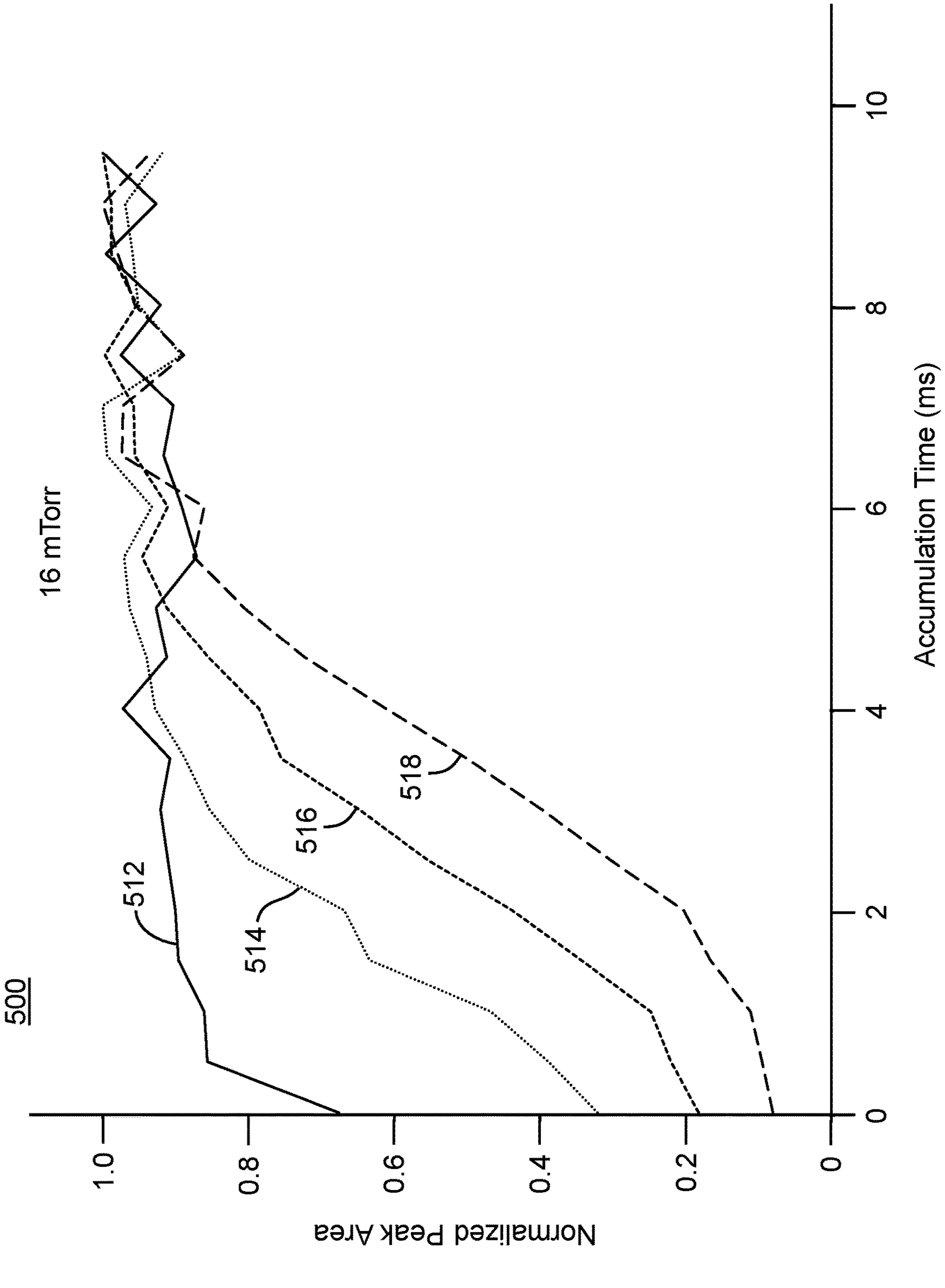
FIG. 5A is a plot of observed signal intensities of ions of selected ion species within the ion routing multipole apparatus of FIG. 1B versus flight times from the C-Trap to the ion routing multipole apparatus, where gas pressure in the ion routing multipole is 16 mTorr.

Graph 500 of FIG. 5A is a detailed plot of normalized mass spectral intensity data for specific ion species that were used to create the contour plot of FIG. 3B. All data plotted in graph 500 pertains to transfer of ions from an IRM 114 and accumulation of the transferred ions in a C-Trap 110 as shown in FIG. 1B, where the gas pressure of the IRM is 16 mTorr. Specifically, line plots 512, 514, 516 and 518 of graph 500 pertain to standard calibrant ion species having m/z values of 322, 1022, 1422 and 1822, respectively. This graph indicates that, at this pressure, a transfer time of 6 ms is sufficient to transfer essentially all ions in the mass range of general interest, 200<m/z<2000. At shorter transfer times, however, the transfer efficiency is strongly dependent on m/z.

Figure 5B:
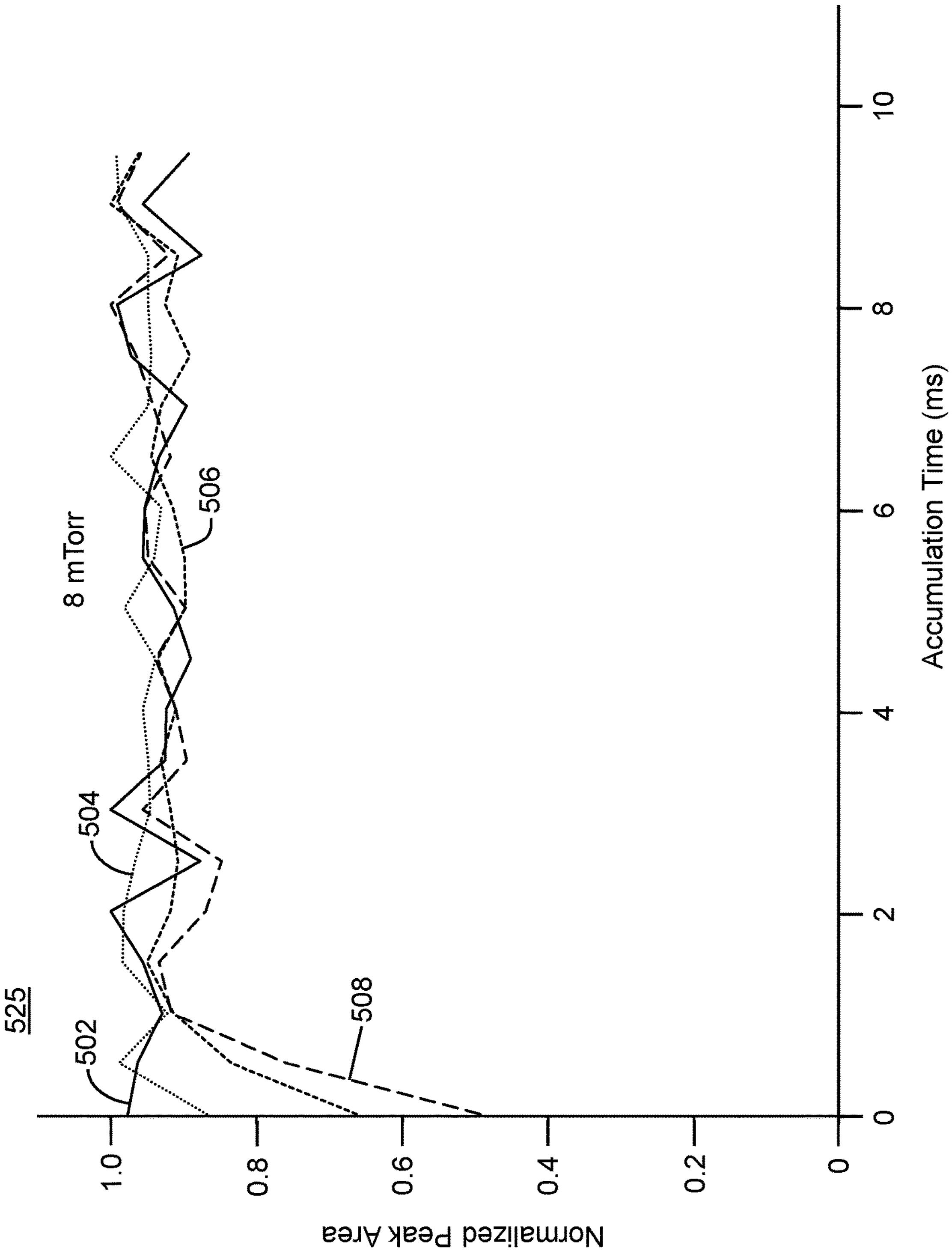
FIG. 5B is a plot of observed signal intensities of ions of a set of selected ion species within the ion routing multipole apparatus of FIG. 1B versus flight times from the C-Trap to the ion routing multipole apparatus, where gas pressure in the ion routing multipole is 8 mTorr.

The graph 500 of FIG. 5A may be compared with graph 525 of FIG. 5B, the data of which pertains to conditions similar to those used to generate the data of graph 500 (FIG. 5A), except that the internal pressure of the IRM 114 was maintained at 8 mTorr. Line plots 502, 504, 506 and 508 of graph 525 pertain to the standard calibrant ion species having m/z values of 322, 1022, 1422 and 1822, respectively. This graph shows that, under the given experimental conditions, a transfer time as short as 2 ms may be sufficient to adequately capture all ion species within the range 200<m/z<2000.

Figure 6A:
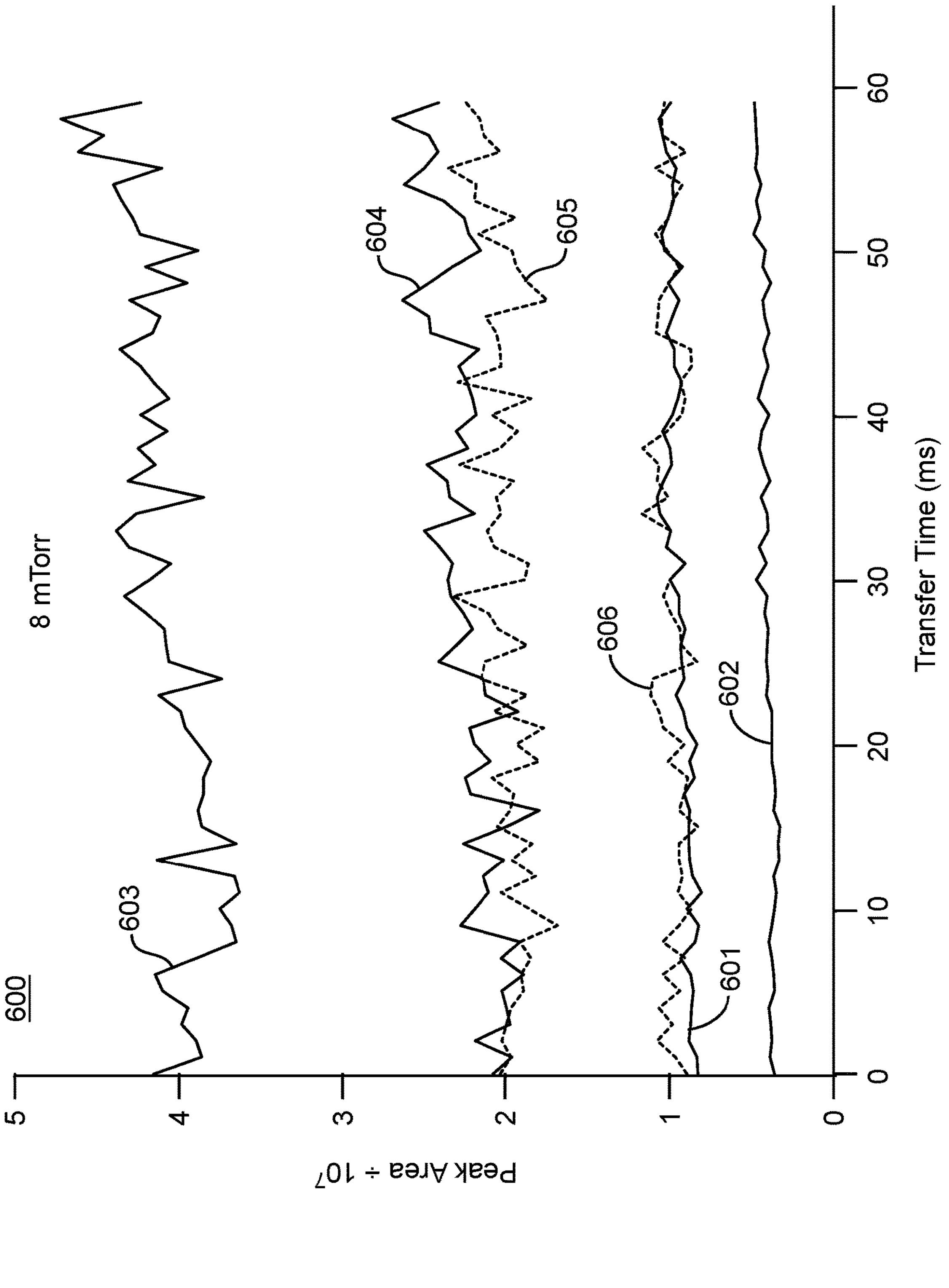
FIG. 6A is a plot of observed signal intensities of ions of another set of selected ion species within the C-trap apparatus of FIG. 1B versus flight times from the ion routing multipole apparatus to the C-trap, where gas pressure in the ion routing multipole is 8 mTorr.
Figure 6B:
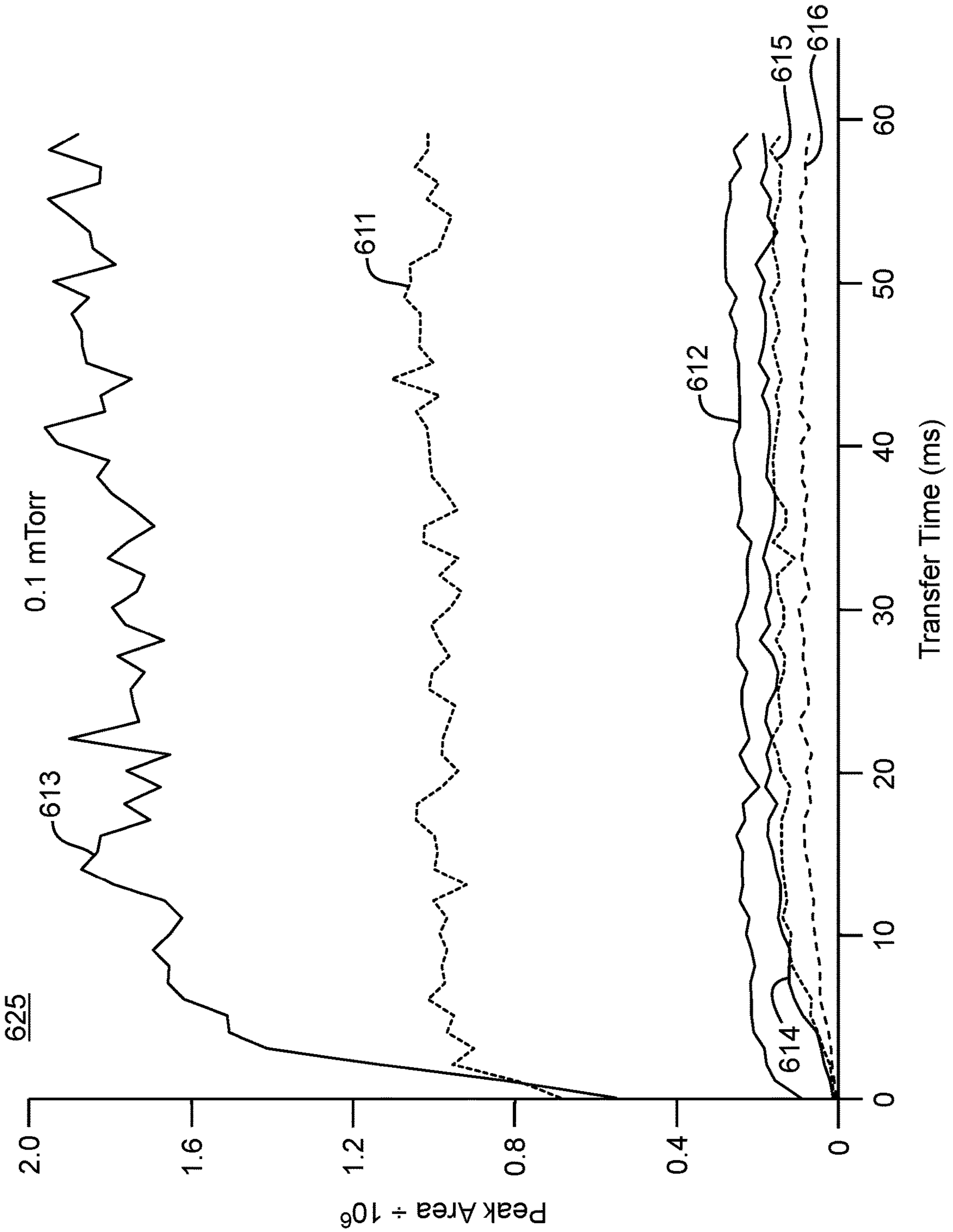
FIG. 6B is a plot of observed signal intensities of ions of selected ion species within the C-trap apparatus of FIG. 1B versus flight times from the ion routing multipole apparatus to the C-trap, where gas pressure in the ion routing multipole is 0.1 mTorr.

Graph 600 of FIG. 6A includes data obtained similarly to the manner in which the data of FIG. 5B was obtained, except that the results for a different set of ion species are presented. Specifically, line plots 601, 602, 603, 604, 605 and 606 of graph 600 pertain to ion species having m/z values of 195, 393, 524, 1422, 1522 and 1722, respectively. Note that the data plotted in FIG. 6A is not normalized; different intensity levels represent different concentrations of the various compounds that generate the ions in a calibration mixture. The plots of FIG. 6A, which were obtained using a gas pressure of 8 mTorr within the IRM 114 may be compared with the plots of graph 625 of FIG. 6B, which pertain to data obtained using a gas pressure of 0.1 mTorr within the IRM 114. Line plots 611, 612, 613, 614, 615 and 666 of graph 625 pertain to ion species having m/z values of 195, 393, 524, 1422, 1522 and 1722, respectively. The difference in the ordinate scales in graphs 600 and 625 should be noted; changing the IRM gas pressure from 8 mTorr to 0.1 mTorr leads to a permanent loss of at least 90 percent of the ions of each species, as this low pressure is only sufficient to capture the least energetic ions.

In order to practically apply the above-taught observations to the operation of mass spectrometer systems that are configured to perform one or more categories of ion transfer between various apparatuses of the mass spectrometer system, it is desirable, according to some embodiments in accordance with the present teachings, to associate, with each of several possible gas pressure values employed during each such transfer category, a respective table of acceptable allotted ion transfer time ranges, where each acceptable allotted ion transfer time range entry in the table corresponds to a range of values of an ion species property. Herein, the term "table" is used in a broad sense; a table may comprise tabulations in a physical document or, preferably, may reside as part of a data file stored electronically in computer memory or external storage. Each table may comprise only a portion of a single computer file, such as a database that comprises a plurality of records that may be logically ordered or merely presented in tabular form.

The tables of acceptable allotted ion transfer time ranges may be generated by conducting signal intensity versus time studies similar to the studies whose results are depicted herein by FIGS. 3A-3B, 4A-4D, 5A-5B and 6A-6B. With regard to the present examples, the various categories of ion transfer operation may include categories such as "ion routing multipole to C-Trap", "C-Trap to ion routing multipole", "ion routing multipole to linear ion trap", "linear ion trap to ion routing multipole" and the like. If a component comprises electrodes that are configured to provide an axial potential profile, then ion transfer categories such as "downstream end of ion routing multipole to linear ion trap" or "C-Trap to upstream end of ion routing multipole" and the like may be included. These mentioned categories are merely illustrative examples; the actual categories employed in any mass spectrometer system will depend on the types of and capabilities of each apparatus in the system. The ion species properties that are used within the tables of acceptable allotted ion transfer time ranges may include such properties as mass-to-charge (m/z) value; ion mass (i.e., "molecular" weight, independent of charge) and, if available, one or more ion mobility constants, K, $K_0$, and C (see Eqs. 1-3).

Each entry in the table of acceptable allotted ion transfer time ranges may comprise a minimum time that must be allotted in order to complete the transfer of a certain predetermined percentage, such as ninety percent, of an ion species having all of its various properties within the ranges to which the entry pertains, when the employed gas pressure is in the range to which the table pertains. In some instances, more than one table entry may map to a single combination of ion transfer category, gas pressure and ion properties ranges. For example, a first table entry may correspond to ninety percent ion transfer while a second table entry may correspond to, for example, eighty percent ion transfer.

As an alternative to providing tables of acceptable allotted ion transfer time ranges, tables of voltage settings to be applied to gate electrodes, ion lenses, or auxiliary electrodes may be provided instead. Increasing the voltage difference between two such electrodes may be used to increase the electric field between the electrodes and thereby increase ion transfer velocity, as described by Eq. 1. Thus, as either gas pressure increases or ion velocity, v, decreases (e.g., as a result of particular ion properties) the electric field strength may be increased, by the application of an appropriate potential difference, in order to maintain ion transfer time constant. This method of adjusting electric fields is less preferred than the method of allotting different transfer times for different pressures or different ion properties, since the varying field strength may lead to unwanted ion fragmentation.

In accordance with methods of the present teachings, tables of acceptable allotted ion transfer time ranges or, less preferably, tables of applied voltage settings may be consulted in order to determine optimal transfer times or optimal voltage settings to be used during the transfers of ion species between different apparatuses. The tables of acceptable allotted ion transfer time ranges may be employed when different ion species are being transferred under non-time-varying gas pressure conditions. The tables of applied voltage settings may be employed when the same ion species are transferred under time-varying pressure conditions. After construction of the tables, subsequent mass spectral measurements may then utilize the various time or voltage settings derived from the tables, performing adjustments to the allotted-time settings or applied voltage settings as required. Preferably, such table consultation and settings adjustments are performed automatically. For example, if different ion species having different ion mobilities are being separately transferred from a first apparatus of a mass spectrometer system to a second apparatus of the system, then a first ion species may be transferred using first settings followed, at a later time, by transfer of a second ion species using second settings. Alternatively, if different ion species (e.g., "species A" and "species B") having different ion mobilities are being transferred together, as a batch of ions comprising a plurality of species, then the tables may be consulted to determine a single compromise setting that provides acceptable transfer efficiency of both species (e.g., not less than x percent of species A and, at the same time, not less than y percent of species B).

As an alternative to employing tables of acceptable allotted ion transfer time ranges or tables of voltage settings, various other embodiments in accordance with the present teachings may employ equations that fit measured transfer times to characteristics of the ions that are being transferred. For example, a simple linear relationship such as $\Delta t=(a\times m)+b$ may suffice in some special regimes of pressure and/or masses or mass-to-charge ratios, where At represents transfer time, m represents either mass or mass-to-charge ratio and a and b are empirical constants that are derived from measured transfer times. These equations may be further expanded to include higher-order terms as well as additional independent variables, such as gas pressure, ion mobility, etc. Such equations can then be applied to calculate transfer times for ions not initially captured in the transfer time table.

Figure 7:
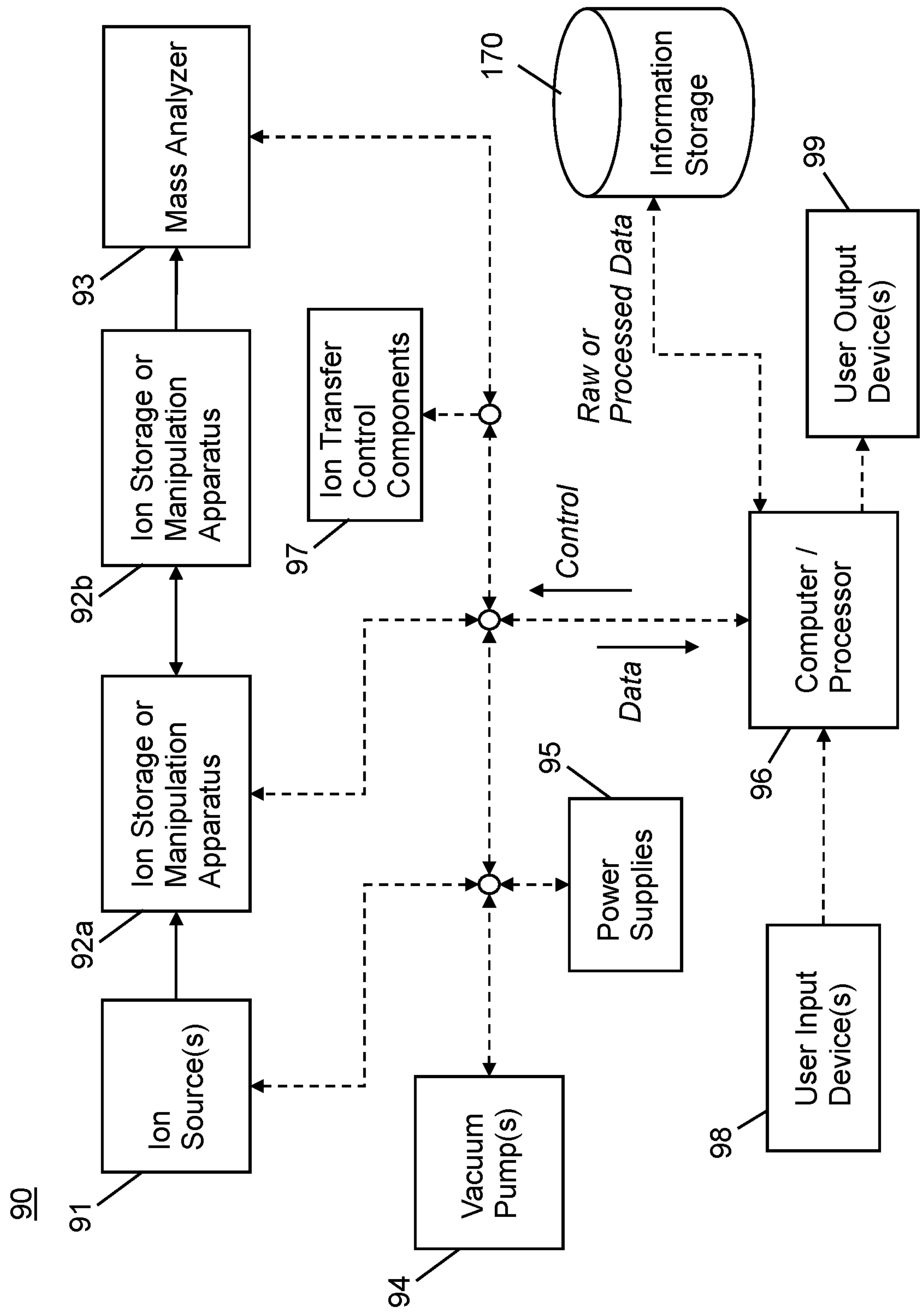
FIG. 7 is a schematic illustration of a generalized mass spectrometer system on which methods in accordance with the present teachings may be practiced.

FIG. 7 schematically illustrates a generalized mass spectrometer system 90 on which methods in accordance with the present teachings may be practiced. The mass spectrometer system includes a set of various hardware components, e.g., an ion source 91, a first ion storage or ion manipulation apparatus 92*a*, a second ion storage or ion manipulation apparatus 92*b*, a mass analyzer 93, one or more vacuum pumps 94 and one or more power supplies 95. The system 90 also includes various ion transfer control components 97 (e.g., ion gates and ion lenses) that are generally disposed between the apparatuses 91, 92*a*, 92*b* and 93 and that control the flow of ions among and between these apparatuses. Various of the hardware components 91-95 and 97 comprise electrodes, electrical components or motors and may comprise various sensors and detectors, such as temperature sensors, pressure sensors, current sensors, ion detectors, etc. Electrical power connections (not shown in FIG. 7) provide RF and DC voltages to electrodes of the apparatuses 91-95 and 97. The various electrodes, other electrical components, motors and sensors are electrically or electronically coupled to a computer or other digital-logic controller processor apparatus 96. The signal-carrying electronic couplings, illustrated by dashed arrows in FIG. 7, convey control signals to the various hardware components 91-95 and may also convey data from at least some of the hardware components to the computer or controller 96. The computer or controller is also coupled to one or more data storage devices 170, various user input devices 98 such as keyboards, terminals, etc. and various user output devices 99.

In the context of the present teachings, the computer or controller 96 may transmit control signals to the ion source 91 to generate and provide ions of sample and/or calibrant materials to the apparatuses 92*a*, 92*b*, 93. The computer or controller 96 also sends signals of the ion transfer control components 97 to route various of the ions through and between the other hardware components at various times. The computer or controller 96 may also transmit control signals to the one or more vacuum pumps 94 to evacuate the various mass spectrometer components or, alternatively, may send control signals to gas valves (not illustrated) to provide gas to one or more compartments. Pressure and temperature sensors within the various mass spectrometer components may transmit data back to the controller that is used by the controller to determine when the various mass spectrometer components are available and ready to measure data. Various sensor data, operational configuration data and experimental data may be stored in the information storage device 170.

After providing samples to be analyzed, a user may input information relating to the samples—including the types of analytes that are to be quantified or otherwise detected—to the computer or controller 96 through various user input devices 98. The user may also specify one or more methods of mass spectral analysis that are to be performed, including details regarding desired mass spectral resolution, desired sensitivity, etc. The computer or controller 96 may then query databases stored on the information storage device(s) 170 for detailed information regarding the nature and timing of control signals that are to be transmitted to the mass spectrometer hardware components 91-95 in order to carry out the analysis or analyses of the sample in accordance with the user-specified methods. The control signals and the timing thereof may pertain to the mass-to-charge values of ion species to be isolated and fragmented (if any), the fragmentation techniques (if any) to be employed, the sequences of routing and/or storing precursor ions and, possibly, fragment ions through and in the mass spectrometer components, and which gas pressures are to be employed in the mass spectrometer components during the routing and/or storing of ions.

The information that is retrieved from the information storage device(s) 170 may also include, according to some embodiments in accordance with the present teachings, tables of acceptable allotted ion transfer time ranges, such as are discussed above, to be used during the transfers of different ion species under constant pressure conditions. Additionally or alternatively, the information may include tables of applied voltage settings, such as are discussed above, to be used during transfers of identical or similar ion species under varying pressure conditions. According to some other embodiments, information that is retrieved from the information storage device(s) may include sets of empirically-derived coefficients of equations that describe transfer time or voltage as a function of the properties of the ions that are being transferred (m/z, ion mass, ion mobility, etc.). Upon carrying out the analyses according to the user-specified methods, the control signals that are transmitted to the mass spectrometer component apparatuses cause either precursor ions or fragment ions to be routed through and/or temporarily stored within each apparatus in accordance with the user-specified methods. These control signals may automatically adjust the time allotted for transferring various packets of ions between apparatuses in accordance with information input from tables of acceptable allotted ion transfer time ranges. Additionally or alternatively, the control signals may automatically adjust the voltage settings that are applied to gate electrodes or ion lenses during transfers of packets of ions between apparatuses in accordance with information input from the tables of applied voltage settings.

In general, mass spectrometer systems, such as the system 1 depicted in FIG. 1A and the system 150 depicted in FIG. 1B comprise various additional ion optical components, such as ion lenses and ion gates (not specifically shown in the FIGS. 1A-1B but included within the ion transfer control components 97 of FIG. 7) that are configured to focus and guide ions between component apparatuses and to either allow or arrest the flow of ions between those apparatuses. In the context of the present teachings, an ion transfer from a first component apparatus to a second component apparatus commences at the time that a voltage is provided to one of these optical components that causes the release of ions from their prior confinement within the first apparatus. Let this release time be denoted as t'. Simultaneously (at time t'), a voltage may be provided to another ion optical component that permits ions to enter the second apparatus. The voltages provided to electrodes of the ion optical components are in response to control signals transmitted from the computer or controller 96.

According to the present teachings, the duration of ion transfer from a first to a second apparatus is variable depending upon certain properties of the ions (e.g., mass, m, mass-to-charge m/z, ion mobility coefficient, etc.) as well as upon gas pressure within either the first or second apparatus. Let this time duration be denoted as $\Delta t$. Accordingly, the transfer completes at the expiry of this time duration. Let the time that the transfer completes be denoted as t". Accordingly, $t''=t'+\Delta t$. At time t", a signal is transmitted from the computer or controller 96 that causes a voltage to be provided to the first ion optical component that arrests further flow of ions out of the first apparatus. This restores confinement of ions within the first apparatus so as to possibly accumulate a new batch of ions, if necessary. Simultaneously, (at time t"), a signal may be transmitted from the computer or controller 96 that causes a voltage to be provided to the second ion optical component that prevents further flow of ions into the first apparatus, thereby preventing stray ions from entering the second apparatus and possibly confining the transferred batch of ions therein.

Novel methods and systems for transferring ions between trapping devices of variable internal pressure have been disclosed herein. The discussion included in this application is intended to serve as a basic description. The present invention is not intended to be limited in scope by the specific embodiments described herein, which are intended as single illustrations of individual aspects of the invention, and functionally equivalent methods and components are within the scope of the invention. Various other modifications of the invention, in addition to those shown and described herein will become apparent to those skilled in the art from the foregoing description and accompanying drawings. Such modifications are intended to fall within the scope of the appended claims. Any patents, patent applications, patent application publications or other literature mentioned herein are hereby incorporated by reference herein in their respective entirety as if fully set forth herein, except that, in the event of any conflict between the incorporated reference and the present specification, the language of the present specification will control.

What is claimed is:

1. A mass spectrometer system, comprising:

an ion source;

a first multipole apparatus configured to receive ions from the ion source;

a second multipole apparatus configured to perform any of the operations chosen from the group consisting of: receiving ions from the first multipole apparatus, transferring ions to the first multipole apparatus, transferring ions to a third multipole apparatus, and receiving ions from the third multipole apparatus, each of the first, second and third multipole apparatuses comprising a respective upstream end that faces the ion source and a respective downstream end;

a first set of one or more ion gates or ion lenses between the first and second multipole apparatuses and a second set of one or more ion gates or lenses between the second and third multipole apparatuses;

at least one power supply configured to provide voltages to electrodes of the ion source, the mass analyzer, the first, second and third multipole apparatuses and the first and second sets of one or more ion gates or ion lenses; and a computer or electronic controller electrically coupled to the at least one power supply, wherein the computer or electronic controller comprises tangibly-embodied non-transitory computer-readable instructions that are operable to cause the at least one power supply to supply voltages to the electrodes that cause accumulation and storage of ions generated by the ion source within the second multipole apparatus and that further cause subsequent transfer of the accumulated and stored ions to either the first or the third multipole apparatus, wherein a duration of a time for completion of each transfer of the ions is allotted based on predetermined measurements of ion transfer efficiency as a function of at least ion mass-to-charge ratio (m/z) and internal gas pressure within the multipole apparatus to which the ions are being transferred.

2. A mass spectrometer system as recited in claim 1, wherein the tangibly-embodied non-transitory computer-readable instructions that are operable to cause the at least one power supply to supply voltages that cause accumulation and storage of the ions are further operable to cause the accumulation and storage of the ions within an electrical potential well at either the upstream end or the downstream end of the second multipole apparatus.

3. A mass spectrometer system as recited in claim 2, wherein the tangibly-embodied non-transitory computer-readable instructions that are operable to cause the at least one power supply to supply voltages that cause the transfer of the accumulated and stored ions are further operable to cause the at least one power supply to supply voltages that cause the ions to be transferred to and to accumulate at an electrical potential well within the multipole apparatus to which the ions are transferred.

4. A mass spectrometer system as recited in claim 1, wherein a duration of time allotted for completion of a transfer of the ions is further based on predetermined measurements of ion transfer efficiency as a function of one or more of the group of ion properties consisting of: ion mass (m) and ion mobility constant.

5. A mass spectrometer system as recited in claim 1, further comprising:

a gas supply;

a gas inlet valve that is electrically coupled to the computer or electronic controller and that is fluidically coupled to the gas supply and fluidically coupled to an enclosure that encloses the second multipole apparatus;

a pressure sensor that is electrically coupled to the computer or electronic controller and that is fluidically coupled to the enclosure;

wherein the computer or electronic controller comprises computer-readable instructions that are operable to cause the gas inlet valve to variably open or close so as to maintain a constant gas pressure within the enclosure.

6. A mass spectrometer system as recited in claim 1, further comprising:

a gas supply;

a gas inlet valve that is electrically coupled to the computer or electronic controller and that is fluidically coupled to the gas supply and fluidically coupled to an enclosure that encloses the multipole apparatus to which the ions are transferred;

a pressure sensor that is electrically coupled to the computer or electronic controller and that is fluidically coupled to the enclosure;

wherein the computer or electronic controller comprises computer-readable instructions that are operable to cause the gas inlet valve to variably open or close so as to maintain a constant gas pressure within the enclosure.

7. A mass spectrometer system as recited in claim 1, wherein the internal gas pressure is maintained with the range of 3 mTorr to 20 mTorr, inclusive.

8. A method of mass spectrometry, comprising:

generating ions;

transmitting a packet of ions comprising at least a subset of the generated ions through a first multipole apparatus and into a second multipole apparatus through an upstream end of the second multipole apparatus, the upstream end facing a source of the packet of ions;

accumulating and storing the packet of ions within the second multipole apparatus;

performing a first transfer comprising transferring the accumulated and stored packet of ions from the second multipole apparatus into a third multipole apparatus through a downstream end of the second multipole apparatus, the downstream end being opposite to the upstream end; and performing a second transfer comprising transferring either the packet of ions or a different packet of ions into the second multipole apparatus through the downstream end of the second multipole apparatus, wherein a duration of a time for completion of the first transfer or a duration of time for completion of the second transfer is allotted based on predetermined measurements of ion transfer efficiency as a function of at least mass-to-charge ratio (m/z) of the ions being transferred and internal gas pressure within the apparatus to which said ions are being transferred.

9. A method of mass spectrometry as recited in claim 8, wherein the first transfer comprises transferring the accumulated and stored packet of ions from an electrical potential well within the second multipole apparatus that is disposed adjacent to the downstream end.

10. A method of mass spectrometry as recited in claim 8, wherein the first transfer comprises transferring the accumulated and stored packet of ions to an electrical potential well within the third multipole apparatus that is disposed adjacent to an end of the third multipole apparatus that faces the second multipole apparatus.

11. A method of mass spectrometry as recited in claim 8, wherein the second transfer comprises transferring the different packet of ions and wherein an internal pressure within the second multipole apparatus during the second transfer differs from an internal pressure within the second multipole apparatus during the first transfer.

12. A method of mass spectrometry as recited in claim 8, wherein an internal pressure within the second multipole apparatus is maintained with the range of 3 mTorr to 20 mTorr, inclusive, during both the first transfer and the second transfer.

13. A method of mass spectrometry, comprising:

generating ions comprising a first range of mass-to-charge ratios (m/z);

transmitting the ions into a first multipole apparatus and accumulating the ions within the first multipole apparatus;

transferring a first portion of the ions from the first multipole apparatus into a multipole mass analyzer, wherein a first duration of time, $t_1$, for accumulation of the first portion of the ions within the multipole mass analyzer is allotted based on predetermined measurements of ion transfer efficiency as a function of at least ion mass-to-charge ratio (m/z) and internal gas pressure within the multipole mass analyzer;

fragmenting a remaining portion of the ions within the first multipole apparatus, thereby generating fragment ions, the fragment ions comprising a second range of m/z ratios that differs from the first range of m/z ratios;

transferring at least a portion of the fragment ions from the first multipole apparatus into the multipole mass analyzer, wherein a second duration of time, $t_2$, for accumulation of the at least a portion of the fragment ions within the multipole mass analyzer is allotted based on the predetermined measurements of ion transfer efficiency and wherein $t_2 \neq t_1$.

* * * * *